US008131449B2

(12) United States Patent
Koyama et al.

(10) Patent No.: US 8,131,449 B2
(45) Date of Patent: Mar. 6, 2012

(54) FUEL INJECTION CONTROL APPARATUS AND FUEL INJECTION CONTROL METHOD FOR INTERNAL COMBUSTION ENGINE

(75) Inventors: Takashi Koyama, Susono (JP); Hisashi Ohki, Numazu (JP); Kiyoshi Fujiwara, Susono (JP); Tomohiro Kaneko, Mishima (JP); Takahumi Yamada, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 277 days.

(21) Appl. No.: 12/530,966

(22) PCT Filed: Jul. 18, 2008

(86) PCT No.: PCT/IB2008/001885
§ 371 (c)(1),
(2), (4) Date: Sep. 11, 2009

(87) PCT Pub. No.: WO2009/010866
PCT Pub. Date: Jan. 22, 2009

(65) Prior Publication Data
US 2010/0116243 A1    May 13, 2010

(30) Foreign Application Priority Data

Jul. 19, 2007   (JP) .................................. 2007-188654

(51) Int. Cl.
*F02D 41/02* (2006.01)
*G06F 19/00* (2011.01)
*F02M 51/00* (2006.01)
(52) U.S. Cl. .......................... 701/105; 123/299; 123/478

(58) Field of Classification Search .................. 701/104, 701/105; 123/295, 299, 300, 305, 456, 478–481
See application file for complete search history.

(56) References Cited

U.S. PATENT DOCUMENTS

| 4,077,364 A | * | 3/1978 | Aoki ............................... 123/682 |
| 4,364,363 A | * | 12/1982 | Miyagi et al. .................. 123/492 |
| 6,847,881 B2 | * | 1/2005 | Melbert ......................... 701/103 |
| 2002/0157649 A1 | * | 10/2002 | Zimmermann et al. ....... 123/478 |
| 2007/0137619 A1 | * | 6/2007 | Fader et al. .................... 123/435 |
| 2008/0275612 A1 | * | 11/2008 | Vesenjak ......................... 701/54 |

FOREIGN PATENT DOCUMENTS

| DE | 10 2005 062 548 A1 | 7/2007 |
| EP | 1 375 889 A2 | 1/2004 |
| EP | 1 767 766 A1 | 3/2007 |
| JP | 2003-343332 A | 12/2003 |
| JP | 2005-240755 A | 9/2005 |
| WO | 03/069146 A1 | 8/2003 |

* cited by examiner

*Primary Examiner* — Willis Wolfe, Jr.
*Assistant Examiner* — Johnny Hoang
(74) *Attorney, Agent, or Firm* — Sughrue Mion, PLLC

(57) ABSTRACT

A fuel injection valve coupled to a common rail is provided. When fuel injection is carried out, the fuel pressure in the fuel injection valve pulsates. An interval between a pilot injection and a main injection is set so that the main injection is carried out at a zero gradient timing as a timing when the gradient of the fuel pressure in the fuel injection valve after the pilot injection is approximately equal to zero. Owing to a fuel injection control apparatus and a fuel injection control method for an internal combustion engine that perform the above-mentioned control, the fuel injection amount for the subsequent fuel injection following the preceding fuel injection can be reliably held equal to a normal amount.

20 Claims, 22 Drawing Sheets

FUEL INJECTION CONTROL APPARATUS AND FUEL INJECTION CONTROL METHOD FOR INTERNAL COMBUSTION ENGINE

BACKGROUND OF THE INVENTION

The disclosure of Japanese Patent Application No. 2007-188654 filed on Jul. 19, 2007, including the specification, drawings and abstract is incorporated herein by reference in its entirety.

1. Field of the Invention

The invention relates to a fuel injection control apparatus and a fuel injection control method for an internal combustion engine.

2. Description of the Related Art

Conventionally, an internal combustion engine may be equipped with a fuel injection valve that is coupled to a common rail and performs a pilot injection during a compression stroke of the engine and then performs the main injection when the piston is near top dead center in the compression stroke.

However, when the pilot injection is performed, the fuel pressure in the fuel injection valve pulsates. Therefore, there is a brief period where the fuel pressure in the fuel injection valve deviates from a normal fuel pressure. If the main injection is performed during this period, the amount of fuel actually injected during the main injection may deviate from a normal fuel amount.

On the other hand, an error in the amount of fuel actually injected through main injection with respect to the normal fuel amount is determined in accordance with an interval between pilot injection and main injection. That is, the error can be obtained in advance as a function of the interval. Thus, some internal combustion engines are designed to calculate the interval between the pilot injection and the main injection, calculate the error in the main fuel injection amount in accordance with the calculated interval, and correct the main fuel injection amount in accordance with the calculated error (see Japanese Patent Application Publication No. 2005-240755 (JP-A-2005-240755)).

In the above described internal combustion engine, the interval is calculated from the difference between the target pilot injection timing and the target main injection timing. However, the actual main injection timing or the actual pilot injection timing may not always coincide with the corresponding target timing. Accordingly, there is an apprehension that the actual interval may be different from the calculated interval. On the other hand, the error in the fuel injection amount for main injection results from pulsations of the fuel pressure in the fuel injection valve and therefore can greatly change even if the interval changes only slightly. Then, in the aforementioned internal combustion engine, the error in the fuel injection amount for main injection cannot be accurately calculated with ease, and therefore, there is a high likelihood that the actual fuel injection amount during main injection cannot be held equal to the normal amount with ease.

SUMMARY OF THE INVENTION

The invention provides a fuel injection control apparatus and a fuel injection control method that reliably maintains a fuel injection amount for a subsequent fuel injection following preceding a fuel injection equal to a normal amount.

According to a first aspect of the invention, there is provided a fuel injection control apparatus for an internal combustion engine equipped with a fuel injection valve coupled to a common rail and designed to sequentially carry out fuel injection a plurality of times with an interval. In this fuel injection control apparatus, an interval between preceding fuel injection and subsequent fuel injection is set so that the subsequent fuel injection is carried out at a zero gradient timing as a timing when a gradient of a fuel pressure in the fuel injection valve after completion of the preceding fuel injection is approximately equal to zero, when the fuel pressure in the fuel injection valve pulsates in response to the fuel injection.

According to a second aspect of the invention, there is provided a fuel injection control method for an internal combustion engine equipped with a fuel injection valve coupled to a common rail and designed to sequentially carry out fuel injection a plurality of times with an interval. In the fuel injection control method, an interval between the preceding fuel injection and the subsequent fuel injection is set so that the subsequent fuel injection is carried out at a zero gradient timing as a timing when a gradient of a fuel pressure in the fuel injection valve after completion of the preceding fuel injection is approximately equal to zero, when the fuel pressure in the fuel injection valve pulsates in response to the fuel injection.

According to the fuel injection control apparatus and the fuel injection control method as described above, the interval between the preceding fuel injection and the subsequent fuel injection is set so that the subsequent fuel injection is carried out at the zero gradient timing as the timing when the gradient of the fuel pressure in the fuel injection valve after the preceding fuel injection is approximately equal to zero, when the fuel pressure in the fuel injection valve pulsates in response to the fuel injection. Therefore, the amount of dispersion produced in a deviation in the fuel injection amount for the subsequent fuel injection may be reduced. Therefore, the fuel injection amount for the subsequent fuel injection may be reliably held equal to the normal amount.

In the fuel injection control apparatus and the fuel injection control method, the interval may be set so that the subsequent fuel injection is carried out at the zero gradient timing arising for a first time in a case where the zero gradient timing arises a plurality of times after the preceding fuel injection.

In the fuel injection control apparatus and the fuel injection control method, the preceding fuel injection may be set as a pilot injection and the subsequent fuel injection may be set as a main injection. Alternatively, the preceding fuel injection and the subsequent fuel injection may be set as a pilot injection and the main injection may be set after the subsequent fuel injection.

In the fuel injection control apparatus and the fuel injection control method, it is also preferable to change the interval in a stepwise manner so that the subsequent fuel injection is carried out at another different zero gradient timing that occurs after completion of the preceding fuel injection when there is a need to change the interval in a case where the zero gradient timing arises a plurality of times after the preceding fuel injection.

In the fuel injection control apparatus and the fuel injection control method, it is also preferable to reduce a fuel injection amount for the preceding fuel injection over time while maintaining the interval equal to a short interval when there is a need to extend the interval from the short interval to a long interval in a case where a timing when there is a need to carry out the preceding fuel injection is set to a timing advanced from a timing when there is a need to carry out the subsequent fuel injection by the interval, and then extend the interval to the long interval when the fuel injection amount for the preceding fuel injection is reduced to a predetermined lower limit.

According to the fuel injection control apparatus and the fuel injection control method as described above, the interval may be shortened or lengthened to be set to a desirable period in accordance with the load on the internal combustion engine. Therefore, the amounts of HC and smoke discharged from a combustion chamber are reduced.

In the fuel injection control apparatus and the fuel injection control method, the interval may be set so that the subsequent fuel injection is carried out when the fuel pressure in the fuel injection valve is higher than a predetermined set value at the zero gradient timing.

In the fuel injection control apparatus and the fuel injection control method, the preceding fuel injection may be set as a main injection and the subsequent fuel injection may be set as an after-injection.

According to the fuel injection control apparatus and the fuel injection control method as described above, the interval is set so that the subsequent fuel injection is carried out when the fuel pressure in the fuel injection valve is higher than the predetermined set value at the zero gradient timing. Therefore, the injection rate of the subsequent fuel injection, for example, the after-injection can be increased. Therefore, a large amount of fuel can be injected into the combustion chamber, and the amount of discharged smoke can be reduced.

It is also preferable to obtain in advance and store a deviation of an actual fuel injection amount from a normal fuel injection amount for the subsequent fuel injection at the zero gradient timing, and correct a fuel injection time for the subsequent fuel injection based on the deviation.

According to the fuel injection control apparatus and the fuel injection control method as described above, the fuel injection period for the subsequent fuel injection is corrected based on the deviation of the actual fuel injection amount from the normal fuel injection amount for the subsequent fuel injection. Therefore, the fuel injection period for the subsequent fuel injection may be set more accurately.

In the fuel injection control apparatus and the fuel injection control method, it is also preferable to obtain in advance and store a deviation of an actual fuel injection amount from a normal fuel injection amount for the subsequent fuel injection at the zero gradient timing, and set the interval such that the deviation falls within a preset permissible range.

According to the fuel injection control apparatus and the fuel injection control method as described above, the interval is set so that the deviation of the actual fuel injection amount from the normal fuel injection amount for the subsequent fuel injection falls within the preset permissible range. Therefore, the deviation during the subsequent fuel injection is reduced. Therefore, the accuracy of the fuel injection time for the subsequent fuel injection may be ensured even when the trouble of making a correction is saved.

As described above, according to the fuel injection control apparatus and the fuel injection control method as described above, the fuel injection amount for the subsequent fuel injection following the preceding fuel injection may be reliably maintained at the normal amount.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the invention will be described in greater detail with reference to example embodiments.

Figure 1:
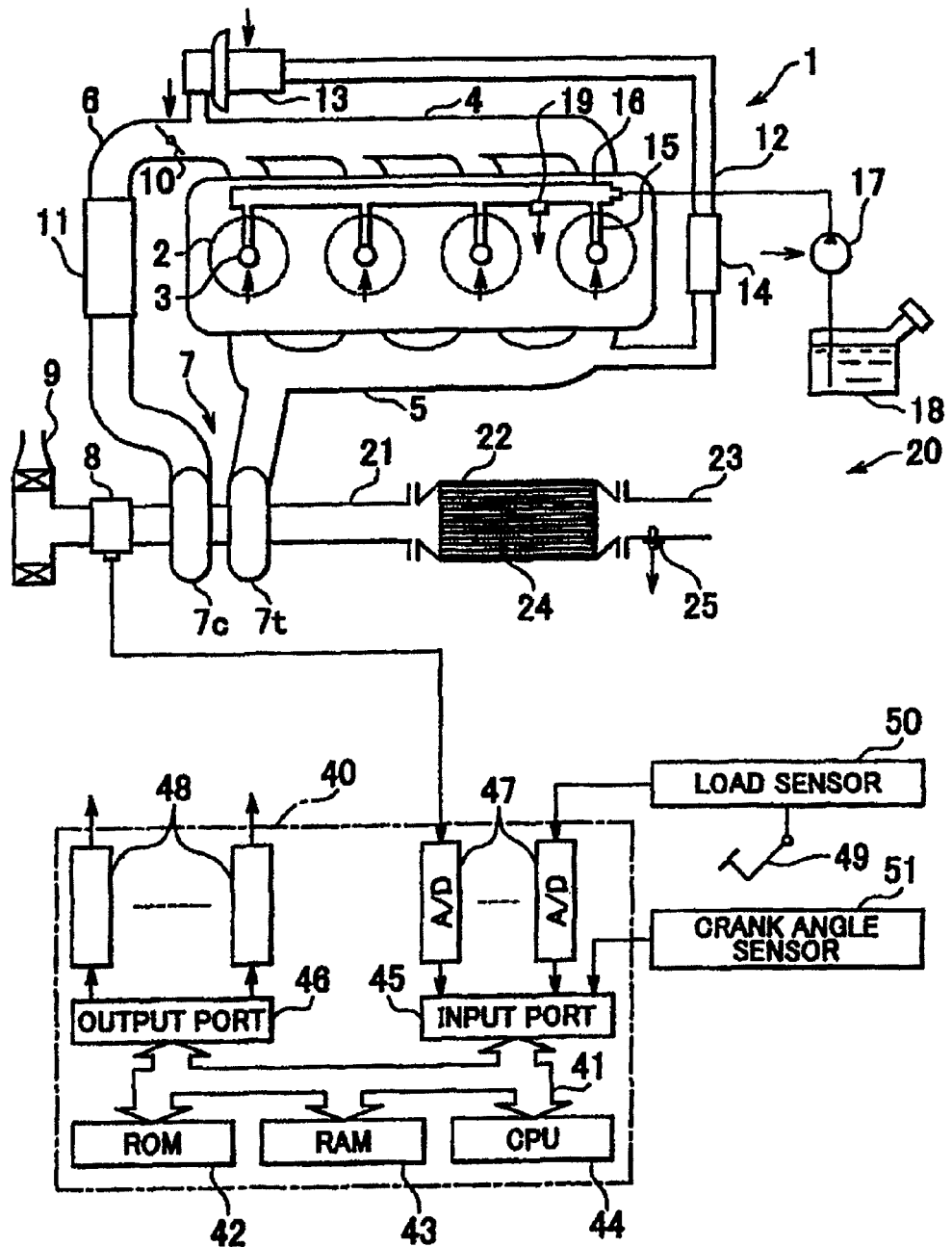
FIG. 1 is a general view of an internal combustion engine.

FIG. 1 shows a case where the invention is applied to a compression ignition type internal combustion engine. The invention is also applicable to a gasoline engine.

Referring to FIG. 1, an engine; a combustion chamber of each cylinder; an electronically controlled fuel injection valve for injecting fuel into each combustion chamber; an intake manifold; and an exhaust manifold are denoted by reference numbers 1, 2, 3, 4, and 5 respectively. The intake manifold 4 is coupled to an outlet of a compressor 7c of an exhaust turbocharger 7 via an intake duct 6, and an inlet of the compressor 7c is coupled to an air cleaner 9 via an airflow meter 8. An electrically controlled throttle valve 10 is disposed in the intake duct 6, and furthermore, a cooling device 11 for cooling intake air flowing through the intake duct 6 is disposed around the intake duct 6. The exhaust manifold 5 is coupled to an inlet of an exhaust turbine 7t of the exhaust turbocharger 7, and an outlet of the exhaust turbine 7t is coupled to an exhaust gas post treatment device 20.

The exhaust manifold 5 and the intake manifold 4 are coupled to each other via an exhaust gas recirculation (hereinafter referred to as EGR) passage 12, and an electrically controlled EGR control valve 13 is disposed in the EGR passage 12. A cooling device 14 for cooling EGR gas flowing through the EGR passage 12 is disposed around the EGR passage 12. Each fuel injection valve 3 is coupled to a common rail 16 via a fuel supply pipe 15, and the common rail 16 is coupled to a fuel tank 18 via an electronically controlled fuel pump 17 that has a variable discharge amount. Fuel in the fuel tank 18 is supplied into the common rail 16 by the fuel pump 17, and the fuel supplied into the common rail 16 is supplied to each fuel injection valve 3 via each fuel supply pipe 15. The common rail 16 is fitted with a fuel pressure sensor 19 for detecting a fuel pressure Pf in the common rail 16, and the discharge rate of the fuel pump 17 is controlled such that the fuel pressure Pf in the common rail 16 coincides with a target fuel pressure PfT.

The exhaust gas post treatment device 20 is equipped with a catalytic converter 22 coupled to the outlet of the exhaust turbine 7t via an exhaust pipe 21, and the catalytic converter 22 is coupled to an exhaust pipe 23. A catalyst 24 carried by, for example, a particulate filter is disposed in the catalytic converter 22. The exhaust pipe 23 is fitted with a temperature sensor 25 for detecting the temperature of exhaust gas discharged from the catalytic converter 22. The temperature of exhaust gas discharged from the catalytic converter 22 represents the temperature of the catalyst 24.

The electronic control unit 40 is constructed of a digital computer, and is equipped with a read only memory (ROM) 42, a random access memory (RAM) 43, a micro processor (CPU) 44, an input port 45, and an output port 46, which are connected to one another by a bidirectional bus 41. The airflow meter 8 generates the output voltage proportional to an intake air amount, and the output voltage is input to the input port 45 via a corresponding one of AD converters 47. An output signal of the temperature sensor 25 is input to the input port 45 via a corresponding one of the AD converters 47. A load sensor 50 for generating an output voltage proportional to the depression amount L of an accelerator pedal 49 is connected to the accelerator pedal 49, and the output voltage of the load sensor 50 is input to the input port 45 via a corresponding one of the AD converters 47. The depression amount L of the accelerator pedal 49 represents a required load. In addition, a crank angle sensor 51 for generating an output pulse every time a crankshaft rotates by, for example, 30° is connected to the input port 45. The output port 46 is connected to the fuel injection valve 3, a drive device for the throttle valve 10, the EGR control valve 13, and the fuel pump 17 via corresponding drive circuits 48 respectively.

Figure 2:
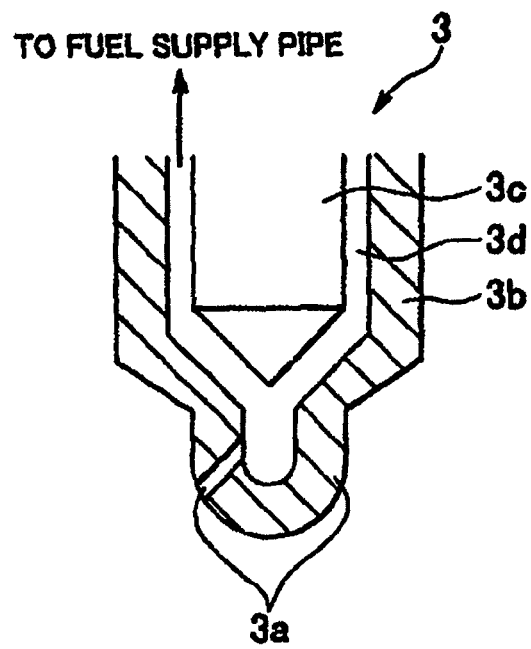
FIG. 2 is a partially enlarged cross-sectional view of a fuel injection valve.

Referring to FIG. 2, the fuel injection valve 3 is constituted by a housing 3b that has an injection hole 3a, and a needle 3c that is slidably accommodated in the housing 3b. A fuel passage 3d is formed between an inner peripheral face of the housing 3b and an outer peripheral face of the needle 3c, and is coupled to the common rail 16 via the fuel supply pipe 15. When an actuator (not shown) such as a solenoid coil is energized, the needle 3c moves away from the inner peripheral face of the housing 3h, and the injection hole 3a is brought into communication with the fuel passage 3d. That is, the fuel injection valve 3 is opened, and hence fuel in the fuel passage 3d is injected via the injection hole 3a. When the actuator is deenergized, the needle 3c is urged toward the inner peripheral face of the housing 3b by, for example, a compression spring (not shown). Then, when the needle 3c sits on the inner peripheral face of the housing 3b, the injection hole 3a is shut off from the fuel passage 3d. That is, the fuel injection valve 3 is closed, and hence fuel injection is stopped.

Figure 3:
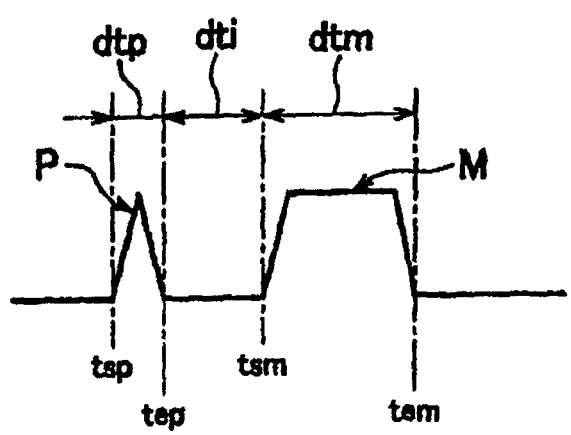
FIG. 3 is a time chart showing a needle lift amount of the fuel injection valve according to the first embodiment of the invention.

In the first embodiment of the invention, as shown in FIG. 3, main injection M is carried out around a compression top dead center, and pilot injection P is carried out once in a compression stroke prior to main injection M. The outline of a method of setting injection parameters such as an injection start timing, an injection end timing, and an injection time will be described with reference to FIG. 3.

That is, first of all, a total fuel injection amount Qt (mm$^3$) as an amount of fuel to be supplied to each cylinder 2 from each fuel injection valve 3 per combustion cycle is calculated. The total fuel injection amount Qt is stored in advance in the ROM 42 in the form of a map shown in FIG. 4 as a function of an engine operational state, for example, the required load L and the engine speed Ne. The start timing tsm for main injection M is then calculated. This start timing tsm for main injection M is stored in advance in the ROM 42 in the form of a map shown in FIG. 5 as a function of an engine operational state, for example, the total fuel injection amount Qt and the engine speed Ne.

Figure 6:
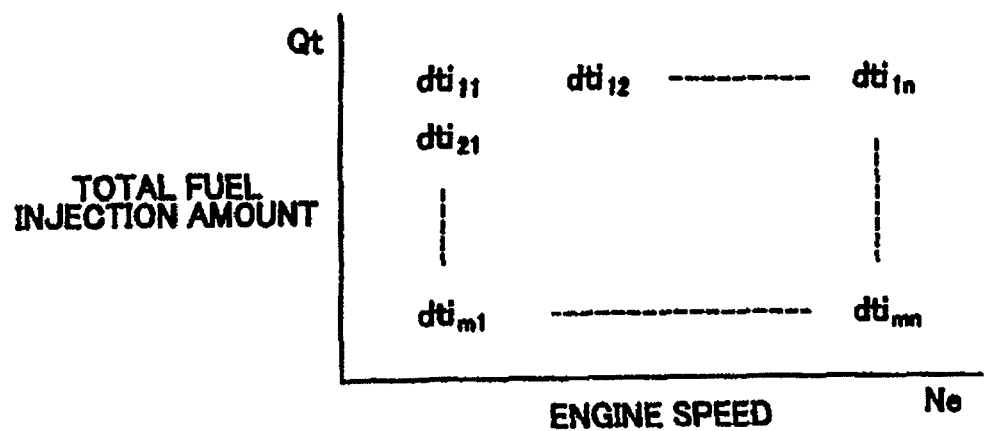
FIG. 6 is a view showing a map of an interval dti.

An interval dti(ms) between the start timing tsm for main injection M and an end timing tep for pilot injection P is then calculated. The interval dti is also stored in advance in the ROM 42 in the form of a map shown in FIG. 6 as a function of the total fuel injection amount Qt and the engine speed Ne.

Figure 7:
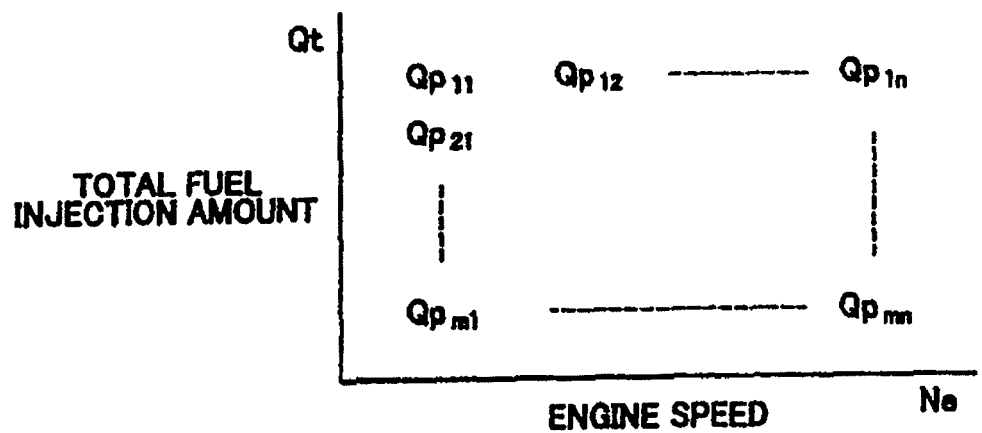
FIG. 7 is a view showing a map of a pilot fuel injection amount Qp.

The end timing tep for pilot injection P is then calculated (tep=tsm−dti). A fuel injection period dtp(ms) for pilot injection P is then calculated. The fuel injection period dtp for pilot injection P is the amount of time needed to inject the pilot injection fuel injection amount Qp(mm$^3$/st) of fuel, and this pilot fuel injection amount Qp is stored in advance in the ROM 42 in the form of a map shown in FIG. 7 as a function of the total fuel injection amount Qt and the engine speed Ne. A start timing tsp for pilot injection P is then calculated (tsp=tep−dtp).

Figure 8:
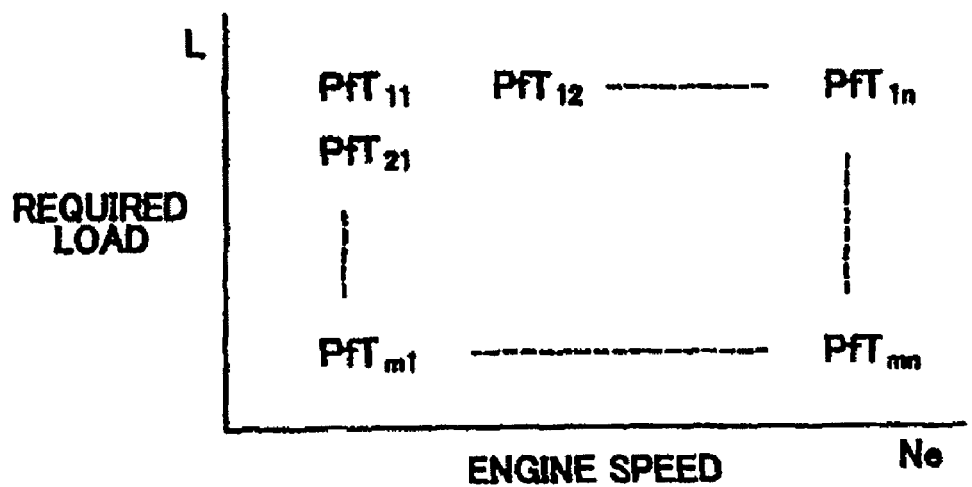
FIG. 8 is a view showing a map of a target fuel pressure PfT.

A fuel injection period dtm for main injection M is then calculated. The fuel injection period dtm for main injection M is the amount of time needed to inject the main fuel injection amount Qm(mm$^3$/st) of fuel at the time when the fuel pressure Pf is equal to the target fuel pressure PfT. An end timing tem for main injection M is then calculated (tem=tsm+dtm). The target fuel pressure PfT of the fuel pressure Pf is stored in advance in the ROM 42 in the form of a map shown in FIG. 8 as a function of an engine operational state, for example, the required load L and the engine speed Ne.

As described above, when fuel is injected by the fuel injection valve 3, fuel pressure pulsations occur in the fuel passage 3d (FIG. 2) of the fuel injection valve 3. That is, when the needle 3c sits on the inner peripheral face of the housing 3b to end fuel injection, pressure waves are produced in the fuel passage 3d. These pressure waves move in a reciprocating manner to and from the common rail 16 via the interior of the fuel supply pipe 15 (FIG. 1), and hence the fuel pressure in the fuel injection valve 3 pulsates. As a result, after pilot injection P is carried out, there is a timing when the fuel pressure in the fuel injection valve 3 deviates from the target fuel pressure NT. If the main injection is carried out at this timing, the amount of fuel actually injected through main injection deviates from a normal fuel injection amount Qm.

Figure 9:
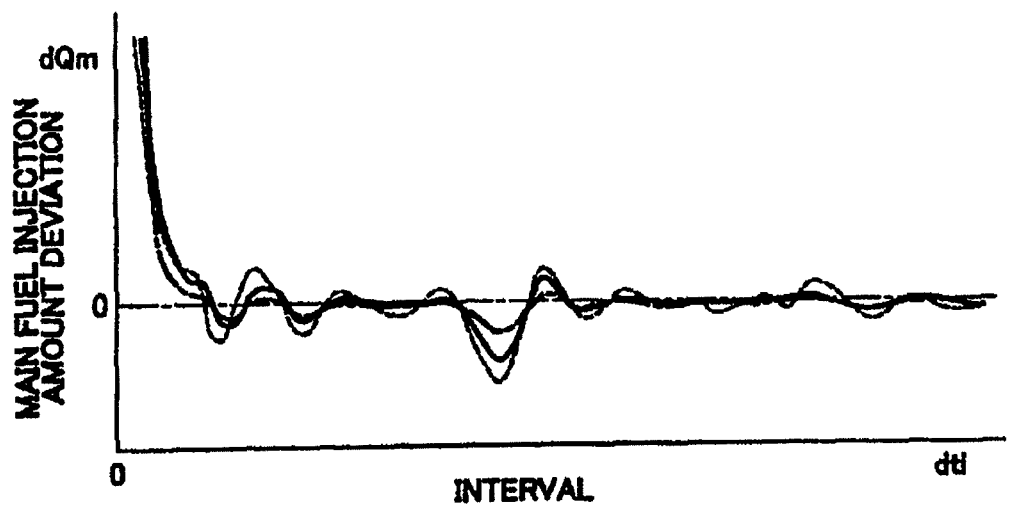
FIG. 9 is a diagram showing a relationship between a main fuel injection amount deviation dQm and the interval dti.

FIG. 9 shows how a main fuel injection amount deviation dQm of the actual amount of fuel injection during the main injection M from the normal main fuel injection amount Qm changes in relation with changes in the interval dti, namely, the timing for starting main injection M after pilot injection P is changed. In FIG. 9, a solid line, dotted lines, and alternate long and short dash lines indicate cases where the fuel pressure Pf and a pilot fuel injection amount Qp assume different values respectively.

As is apparent from FIG. 9, when the interval dti is appropriately changed, the main fuel injection amount deviation dQm pulsates substantially around zero. As shown in FIG. 9, the waveform of the main fuel injection amount deviation dQm differs depending on the fuel pressure Pf and the pilot fuel injection amount Qp in the common rail 16. However, the pulsation cycle of the main fuel injection amount deviation dQm is determined in accordance with a reciprocating distance of pressure waves and the propagation speed as a traveling speed of the pressure waves. Therefore, when the main fuel injection amount deviation dQm is expressed with the axis of abscissa representing the interval dti or time as in FIG. 9, the positions of troughs and crests of the waveform of the main fuel injection amount deviation dQm are substantially maintained regardless of the fuel pressure Pf and the pilot fuel injection amount Qp.

It should be noted herein that the main fuel injection amount deviation dQm depends on the fuel pressure in the fuel injection valve 3 after pilot injection P and thus represents the fuel pressure in the fuel injection valve 3. Changes in the main fuel injection amount deviation dQm in FIG. 9 thus represents changes in the fuel pressure in the fuel injection valve 3 with respect to an elapsed time after pilot injection P.

Figure 10:
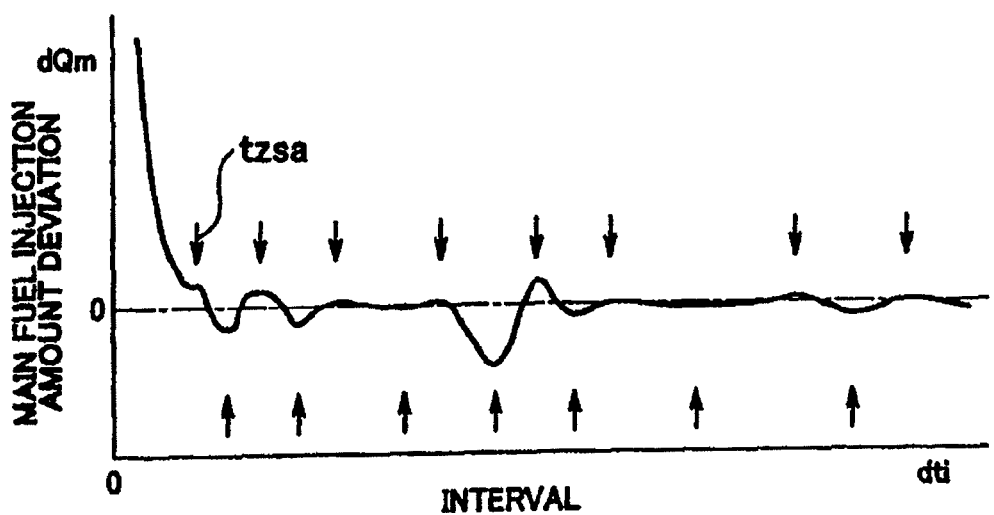
FIG. 10 is a diagram similar to FIG. 9 that shows a zero gradient timing.

In FIG. 10, arrows respectively indicate values of the interval dti where the gradient of the main fuel injection amount deviation dQm is approximately zero, namely, zero gradient timings as timings when the gradient of the fuel pressure in the fuel injection valve 3 after pilot injection P is approximately zero. As is apparent from FIG. 10, the plurality of the zero gradient timings occur after pilot injection P.

In the first embodiment of the invention, the interval dti is set such that main injection M starts at a zero gradient timings, for example, a zero gradient timing tzsa (see FIG. 10) arising for the first time after pilot injection. As described above, the interval dti in this case is stored in advance in the ROM 42 in the form of the map shown in FIG. 6 as a function of the total fuel injection amount Qt and the engine speed Ne.

Figure 11:
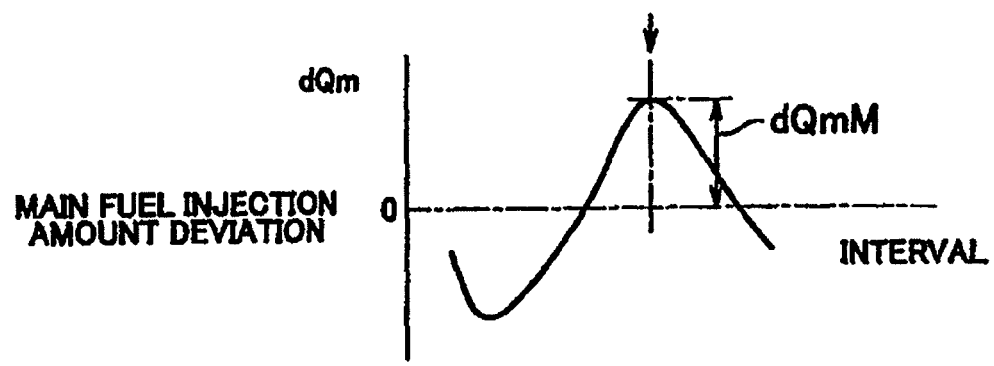
FIG. 11 is a diagram for explaining the main fuel injection amount deviation dQmM at the zero gradient timing.

However, if the interval dti is set such that main injection M is started at the zero gradient timing, the actual main fuel injection amount deviates from a normal main fuel amount by the main fuel injection amount deviation dQmM at the zero gradient timing as shown in FIG. 11.

Figure 12:
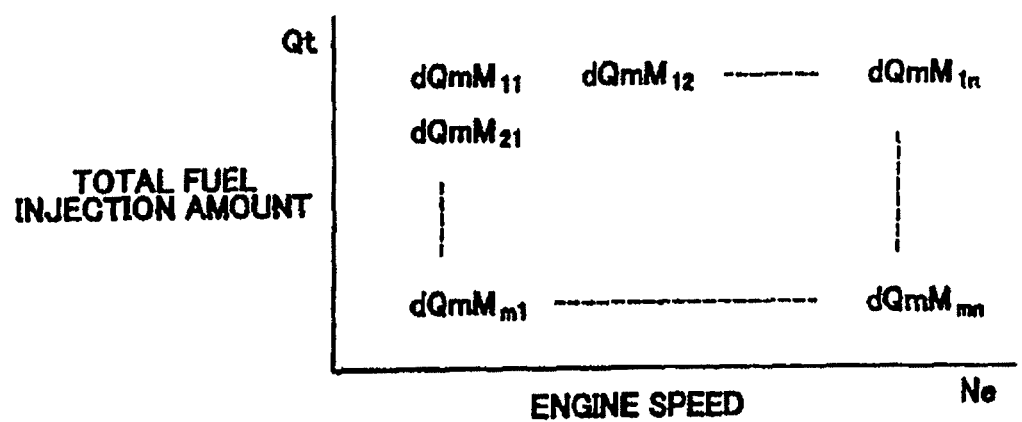
FIG. 12 is a view showing a map of the main fuel injection amount deviation dQmM at the zero gradient timing.

Thus, in the first embodiment of the invention, the main fuel injection amount deviation dQmM at the zero gradient timing tzsa is obtained in advance and stored, and the main fuel injection amount Qm is corrected using the main fuel injection amount deviation dQmM. That is, the main fuel injection amount Qm is calculated by further subtracting the main fuel injection amount deviation dQmM at the zero gradient timing tzsa from a value obtained by subtracting the pilot fuel injection amount Qp from the total fuel injection amount Qt (Qm=Qt−Qp−dQmM). The main fuel injection duration dtm is the time needed to inject the corrected main fuel injection amount Qm. The main fuel injection amount deviation dQmM at the zero gradient timing tzsa is stored in advance in the ROM 42 in the form of a map shown in FIG. 12 as a function of the total fuel injection amount Qt and the engine speed Ne. The main fuel injection amount deviation dQm or dQmM depends on the fuel pressure Pf and the pilot injection amount Qp in the common rail 16, and the fuel pressure Pf and the pilot injection amount Qp in the common rail 16 depend on the total fuel injection amount Qt and the engine speed Ne respectively. Accordingly, the main fuel injection amount deviation dQm or dQmM can be expressed as a function of the total fuel injection amount Qt and the engine speed Ne.

Figure 13A:
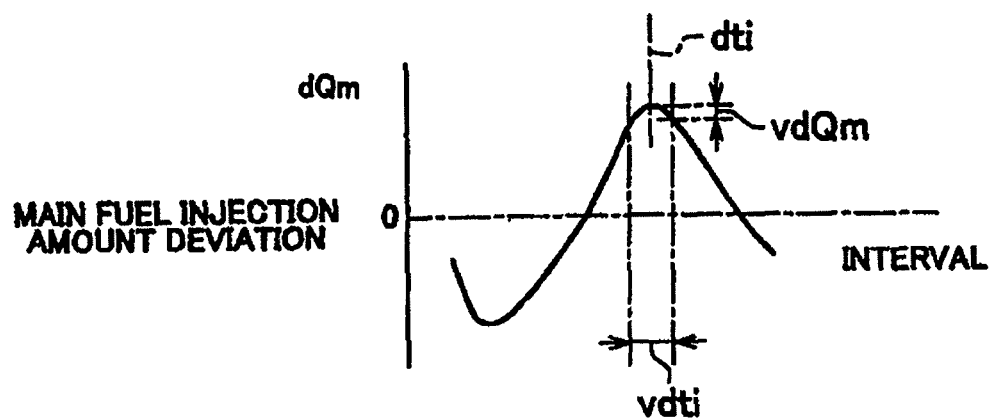
FIGS. 13A and 13B are diagrams for explaining the first embodiment of the invention.
Figure 13B:
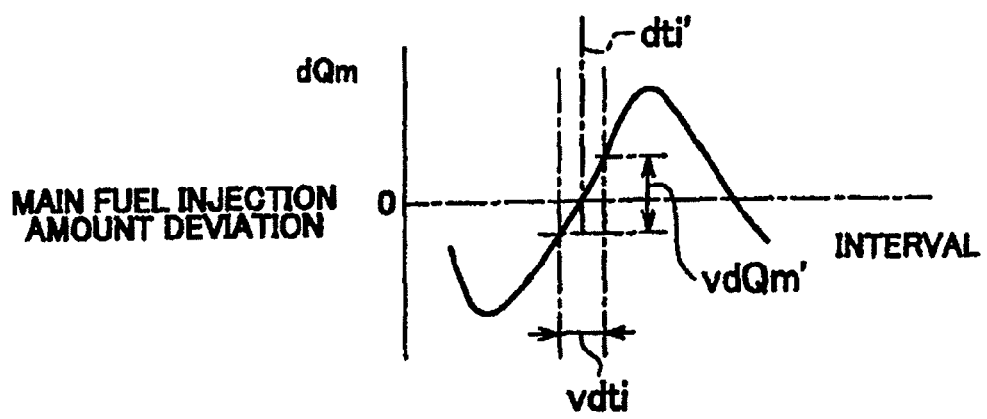

In this respect, if the interval dti is set such that the main fuel injection amount deviation dQm becomes approximately equal to zero, it appears that the main fuel injection amount deviation dQm may be held approximately equal to zero. However, as shown in FIG. 13B, the dispersion of the dimension of the fuel injection valve 3 or the like leads to a dispersion vdti of the interval dti as well. That is, the interval dti fluctuates within the range of the dispersion vdti. As a result, when an interval dti' is set such that the main fuel injection amount deviation dQm becomes approximately equal to zero as shown in FIG. 13B, a great dispersion vdQm of the main fuel injection amount deviation dQm may be caused. This means that reliable correction of the main fuel injection amount Qm is difficult.

In contrast, in the first embodiment of the invention, the interval dti is set such that the gradient of the main fuel injection amount deviation dQm becomes approximately equal to zero. Therefore, the dispersion vdQm of the main fuel injection amount deviation dQm may be held small as shown in FIG. 13A. Accordingly, the main fuel injection amount Qm may be reliably corrected. That is, the actual main fuel injection amount can be reliably made coincident with the normal fuel amount.

Accordingly, generally speaking, in an internal combustion engine designed to sequentially carry out fuel injection a plurality of times with an interval, the interval between the preceding fuel injection and the subsequent fuel injection may be set such that the subsequent fuel injection is carried out at a zero gradient timing as a timing when the gradient of the fuel pressure in the fuel injection valve 3 after the preceding fuel injection is approximately equal to zero. The deviation of the actual fuel injection amount from the normal fuel injection amount when the subsequent fuel injection is carried out at the zero gradient timing is obtained in advance and stored, and the fuel injection period of the subsequent fuel injection is corrected based on the stored deviation.

In this case, the preceding fuel injection and the subsequent fuel injection can be constituted by various types of fuel injection. For example, if the pilot injection is carried out a plurality of times, the preceding fuel injection and the subsequent fuel injection can be constituted by two consecutive rounds of pilot injection. Alternatively, the preceding fuel injection and the subsequent fuel injection may also be constituted by a fuel injection that is carried out before the pilot injection P for the sake of pre-mixture, a fuel injection carried out after the pilot injection P, but before the main injection M, to reduce noise, an after-injection carried out after the main injection M to reduce smoke, a post injection carried out after the main injection M to control exhaust gas post treatment, each of a plurality of divided rounds of main injection M, or the like.

Figure 14:
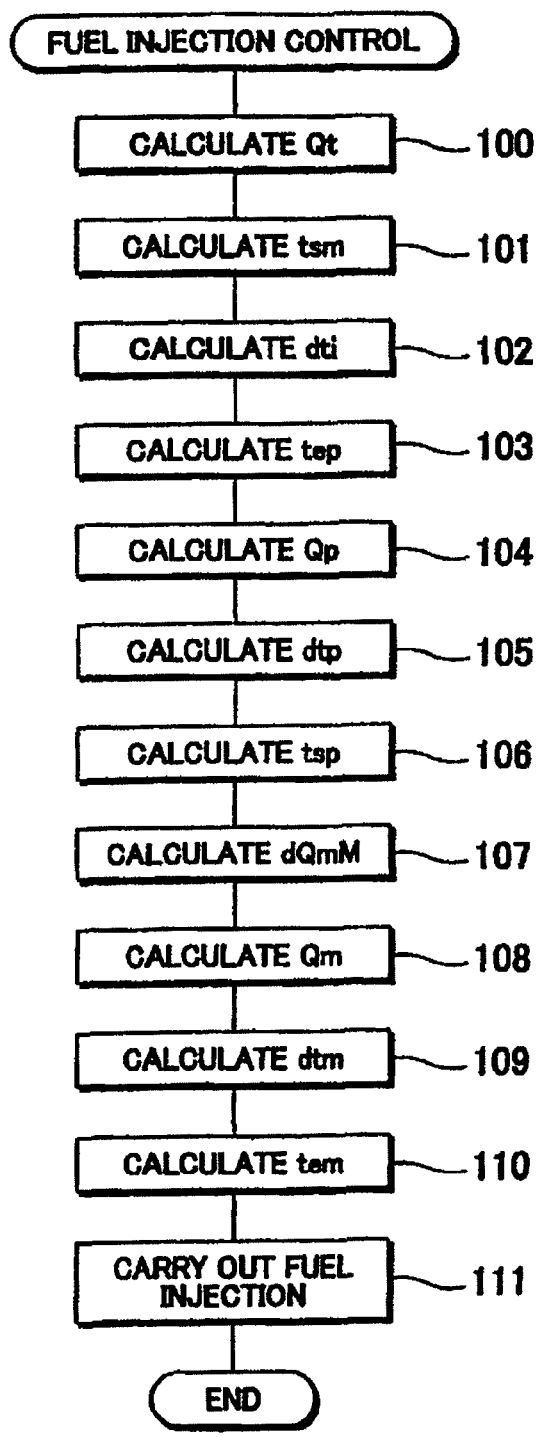
FIG. 14 is a flowchart for executing a fuel injection control routine according to the first embodiment of the invention.

FIG. 14 shows a routine for performing fuel injection control according to the first embodiment of the invention. This routine is executed through interruption at intervals of a certain time.

Figure 4:
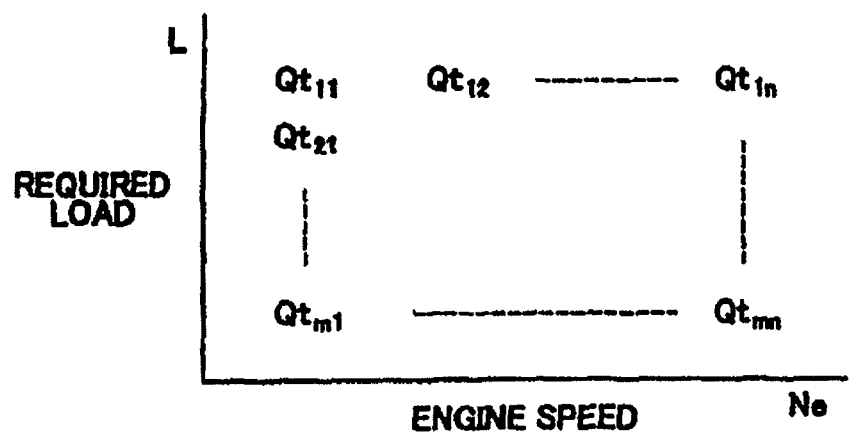
FIG. 4 is a view showing a map of a total fuel injection amount Qt.
Figure 5:
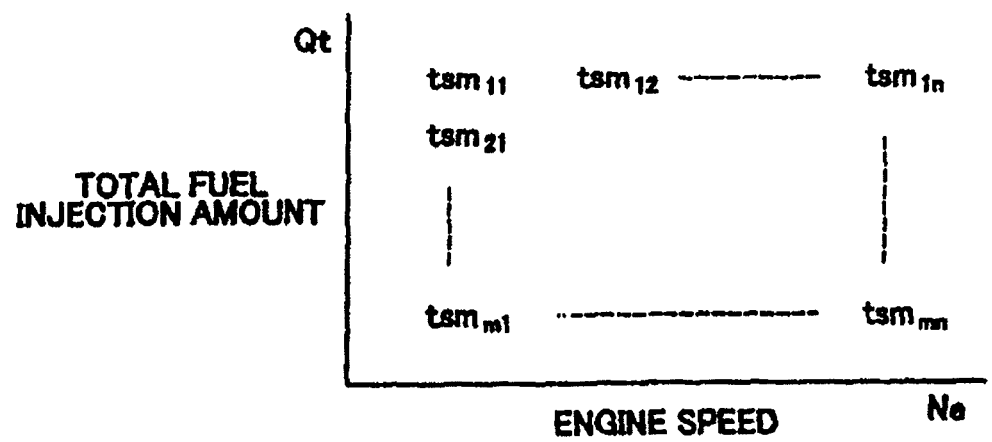
FIG. 5 is a view showing a map of a start timing tsm for main injection.

Referring to FIG. 14, first in step 100, the total fuel injection amount Qt is calculated from the map of FIG. 4. Then in step 101, the start timing tsm of the main injection M is calculated from the map of FIG. 5. Then in step 102, the interval dti is calculated from the map of FIG. 6. Then in step 103, the end timing tep of the pilot injection P is calculated (tep=tsm−dti). Then in step 104, the pilot fuel injection amount Qp is calculated from the map of FIG. 7. Then in step 105, the fuel injection period dtp for the pilot injection P is calculated based on the pilot fuel injection amount Qp. Then in step 106, the start timing tsp for pilot injection P is calculated (tsp=tep−dtp). Then in step 107, the main fuel injection amount deviation dQmM at the zero gradient timing tzsa determined in accordance with the interval dti is calculated from the map of FIG. 12. Then in step 108, the main fuel injection amount Qm is calculated (Qm=Qt−Qp−dQmM). Then in step 109, the fuel injection period dtm for the main injection M is calculated based on the main fuel injection amount Qm. Then in step 110, the end timing tem of the main injection M is calculated (tem=tsm+dtm). Then in step 111, fuel is injected in accordance with the calculated injection parameters.

Figure 15:
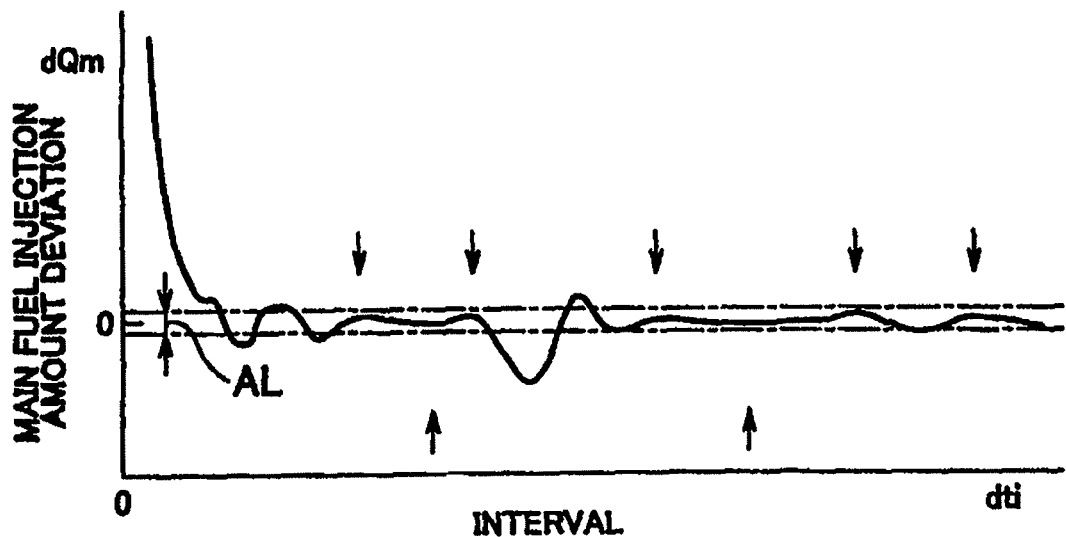
FIG. 15 is a diagram similar to FIG. 9 that serves to explain the second embodiment of the invention.

Next, the second embodiment of the invention will be described. In FIG. 15, each arrow indicates the zero gradient timings following the pilot injection P at which the main fuel injection amount deviation dQm is within a predetermined permissible range AL. In this case, the permissible range AL may be set to a range from −α to +α (α is a small constant value). In the second embodiment of the invention, the interval dti is set such that main injection M is carried out at the zero gradient timings at which the main fuel injection amount deviation dQm is within the predetermined permissible range AL as described above. In this manner, the main fuel injection amount deviation dQmM at the zero gradient timings is reduced, and hence the correction of the main fuel injection amount Qm may be omitted.

The other details of the construction and operation of the second embodiment of the invention are identical to those of the first embodiment of the invention and hence will not be described below.

Figure 16:
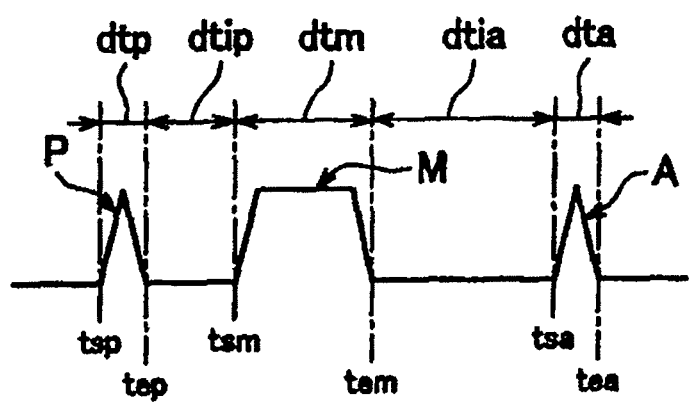
FIG. 16 is a time chart showing a needle lift amount of a fuel injection valve according to the third embodiment of the invention.

Next, the third embodiment of the invention will be described. In the third embodiment of the invention, as shown in FIG. 16, the main injection M is carried out around a compression top dead center, and the after-injection A is carried out during an expansion stroke after main injection M. That is, the main injection M is first carried out, and then the after-injection A is carried out. In the third embodiment of the invention, a pilot injection may be carried out.

The main injection M is carried out around a compression top dead center, the pilot injection P is carried out during a compression stroke before the main injection M, and the after-injection A is carried out during the expansion stroke after the main injection M. That is, the pilot injection P is first carried out, followed by the main injection M and the after-injection A, respectively.

The injection parameters for pilot injection P and main injection M are set in the same manner as in the first embodiment of the invention. Meanwhile, the injection parameters for after-injection A are set as follows.

That is, after the injection parameters for pilot injection P and main injection M are set, an interval dtia between the end timing tem for main injection M and a start timing tsa for after-injection A is first calculated. This interval dtia is stored in advance in the ROM 42 in the form of a map shown in FIG. 17 as a function of the total fuel injection amount Qt and the engine speed Ne. The start timing tsa for after-injection A is then calculated (tsa=tem+dtia). The end timing tea for after-injection A is calculated (tea=tsa+dta). It should be noted that dta denotes a fuel injection period for after-injection A, for example, a fuel injection time necessary for the injection of a constant after fuel injection amount Qa. The after fuel injection amount Qa may be changed in accordance with, for example, the engine operational state.

As is the case with the foregoing first embodiment of the invention, when main injection M is carried out, the fuel pressure in the fuel injection valve 3 pulsates. As a result, as shown in FIG. 18, an after fuel injection amount deviation dQa as a deviation of an actual amount of fuel injected through after-injection A from the normal after fuel injection amount Qa pulsates in accordance with changes in the interval dtia.

Figure 18:
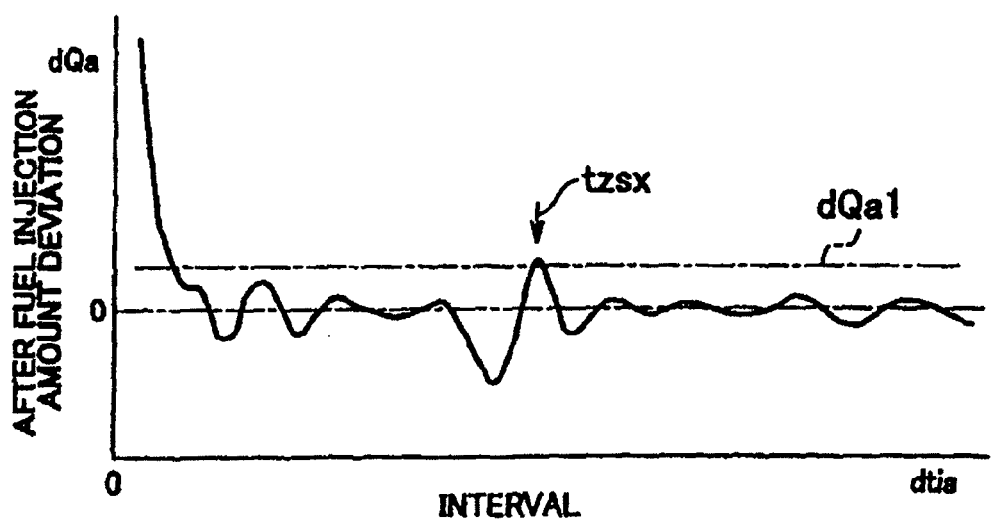
FIG. 18 is a diagram showing a relationship between an after fuel injection amount deviation dQa and the interval dtia.

The arrow in FIG. 18 indicates a zero gradient timing tzsx, in other words, one of the zero gradient timings following the main injection M, at which the after fuel injection amount deviation dQa exceeds a predetermined set amount dQa1. Thus, in the third embodiment of the invention, the interval dtia is set so that the after-injection A is carried out at the zero gradient timing tzsx, at which the after fuel injection amount deviation dQa is greater than the set value dQa1 as described above.

As is apparent from the foregoing description, the after fuel injection amount deviation dQa represents the fuel pressure in the fuel injection valve 3 after main injection M. Accordingly, in the third embodiment of the invention, the interval dtia is set so that after-injection A is carried out when the fuel pressure in the fuel injection valve 3 exceeds the predetermined set pressure. In this manner, the injection rate of after-injection A can be enhanced. Therefore, the large after fuel injection amount Qa of fuel can be injected into the combustion chamber. Accordingly, the amount of smoke is reliably reduced. In addition, the injection pressures for pilot injection P and main injection M are not enhanced. Accordingly, the level of combustion noise is not increased.

Figure 19:
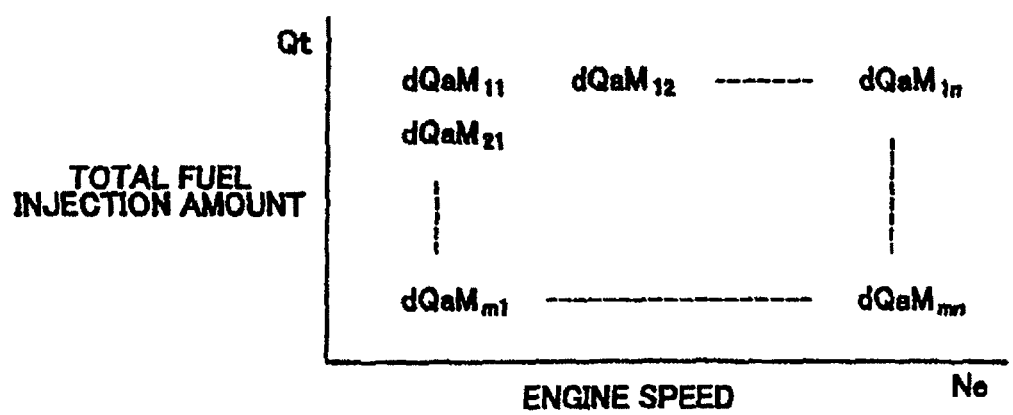
FIG. 19 is a view showing a map of an after fuel injection amount deviation dQaM at a zero gradient timing.

In the third embodiment of the invention, furthermore, the after fuel injection amount deviation dQaM at the zero gradient timing tzsx is stored in advance in the ROM 42 in the form of a map shown in FIG. 19 as a function of the total fuel injection amount Qt and the engine speed Ne. The after fuel injection amount Qa is corrected using the stored deviation dQaM (Qa=Qa−dQaM).

Figure 20:
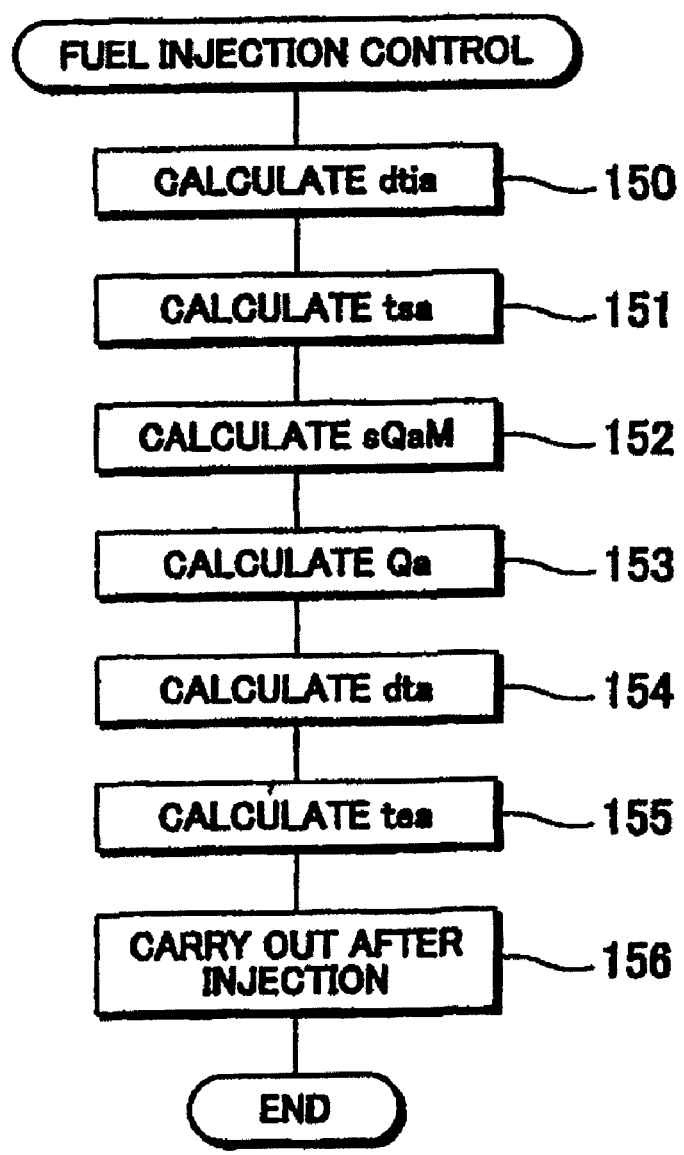
FIG. 20 is a flowchart for performing after-injection control according to the third embodiment of the invention.

FIG. 20 shows a routine for performing the after-injection control according to the third embodiment of the invention. This routine is executed periodically at predetermined intervals.

Figure 17:
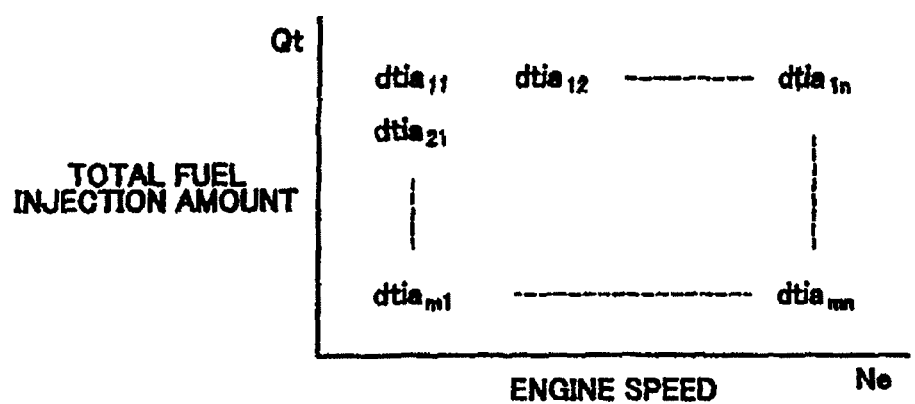
FIG. 17 is a view showing a map of an interval dtia.

Referring to FIG. 20, first in step 150, the interval dtia is calculated from the map of FIG. 17. Then in step 151, the start timing tsa for after-injection A is calculated (tsa =tem+dtia). Then in step 152, the after fuel injection amount deviation dQaM at the zero gradient timing tzsx is calculated from the map of FIG. 19. Then in step 153, the after fuel injection amount Qa is calculated (Qa=Qa−dQaM). Then in step 154, the fuel injection period dta for the after-injection A is calculated. Then in step 155, the end timing tea for the after-injection A is calculated (tea=tsa+dta). Then in step 156, the after-injection is carried out using the calculated injection parameters.

The other details of the construction and operation of the third embodiment of the invention are identical to those of the first embodiment of the invention and hence will not be described below.

Figure 21:
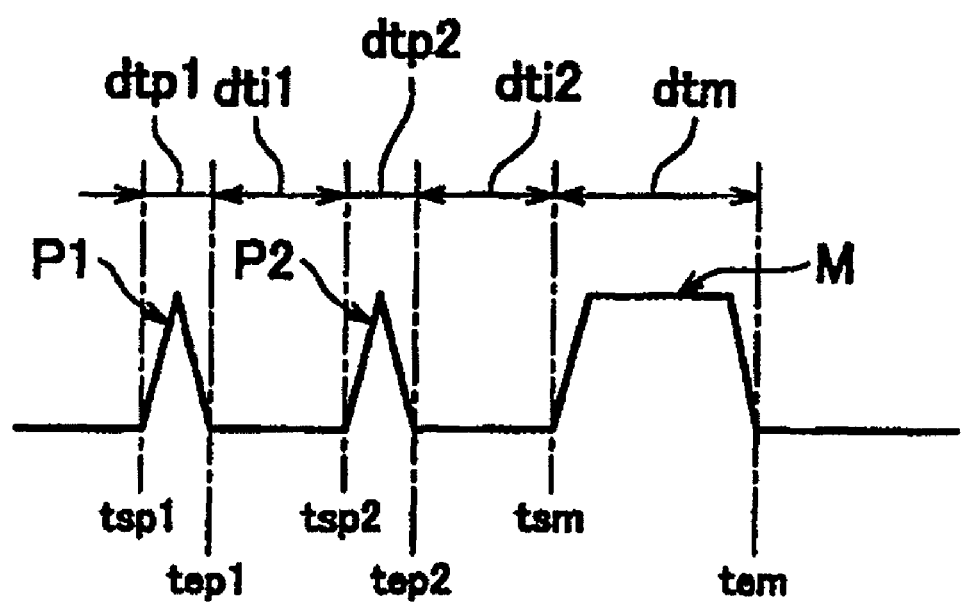
FIG. 21 is a time chart showing a needle lift amount of a fuel injection valve according to the fourth embodiment of the invention.

Next, the fourth embodiment of the invention will be described. In the fourth embodiment of the invention, as shown in FIG. 21, the main injection M is carried out around a compression top dead center, and the pilot injection P is carried out twice during the compression stroke, before the main injection M. That is, a first pilot injection P1 is carried out, followed by a second pilot injection P2, and then the main injection M is carried out. In the fourth embodiment of the invention as well, the after-injection may be carried out.

Figure 22A:
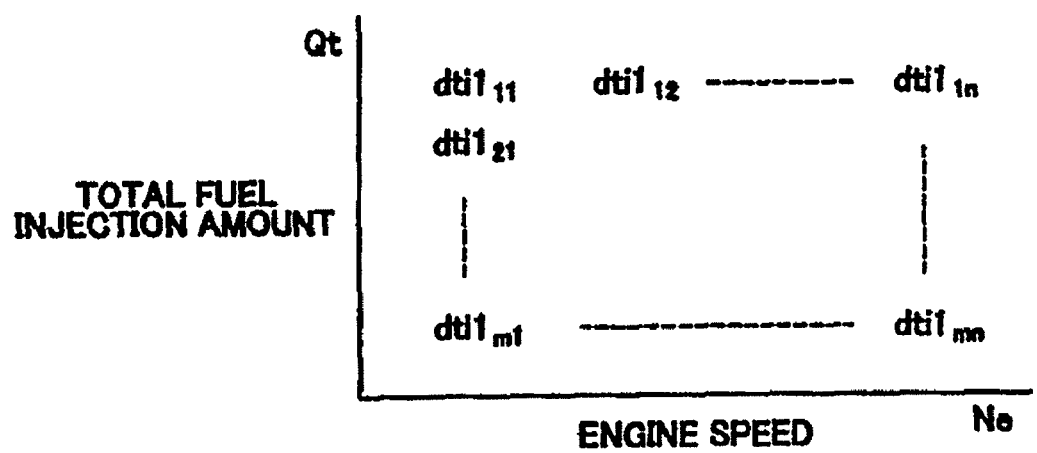
FIGS. 22A and 22B are views showing maps of a first interval dti1 and a second interval dti2 respectively.
Figure 22B:
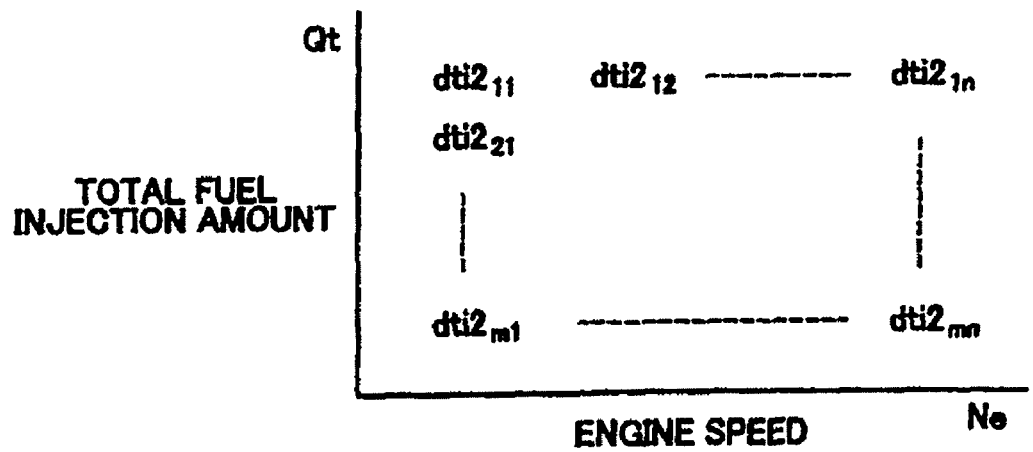
Figure 23A:
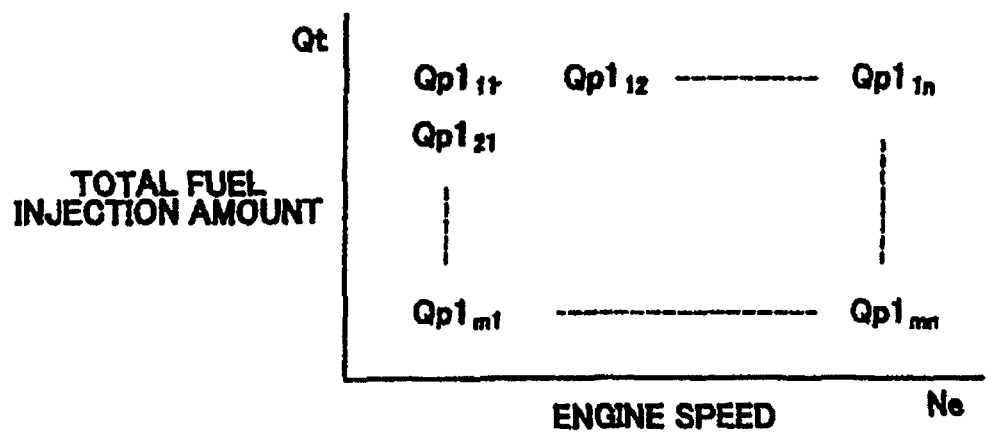
FIGS. 23A and 23B are views showing maps of a first pilot fuel injection amount Qp1 and a second pilot fuel injection amount Qp2 respectively.
Figure 23B:
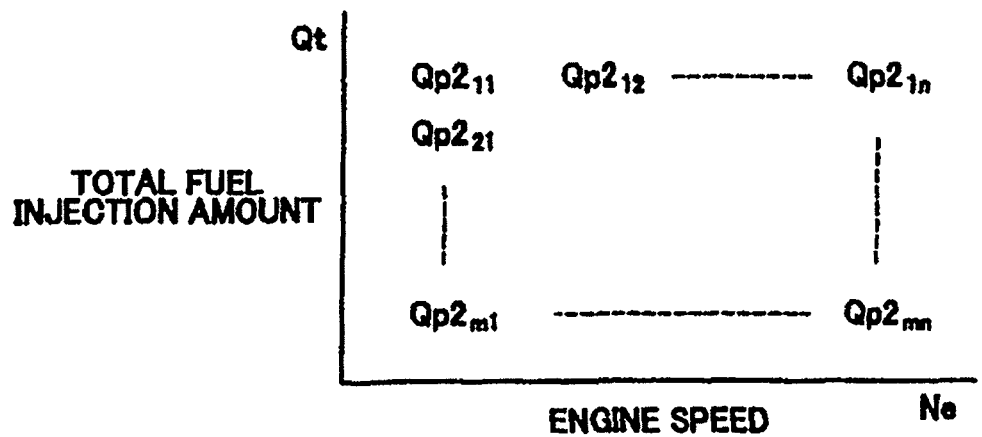

In this case, the total fuel injection amount Qt is first calculated from the map of FIG. 4. The start timing tsm of the main injection M is calculated from the map of FIG A second interval dti2 as an interval between the start timing tsm of the main injection M and the end timing tep2 of the second pilot injection P2, is then calculated. The second interval dti2 is stored in advance in the ROM 42 in the form of a map shown in FIG. 22B as a function of the total fuel injection amount Qt and the engine speed Ne. The end timing tep2 for the second pilot injection P2 is then calculated (tep2=tsm−dti2). A fuel injection period dtp2 for the second pilot injection P2 is then calculated. The fuel injection period dtp2 for the second pilot injection P2 is the amount of time needed to inject the second pilot fuel injection amount Qp2 of fuel. The second pilot fuel injection amount Qp2 is stored in advance in the ROM 42 in the form of a map shown in FIG. 23B as a function of the total fuel injection amount Qt and the engine speed Ne. The start timing tsp2 for second pilot injection P2 is then calculated (tsp2=tep2−dtp2).

A first interval dti1 as an interval between the start timing tsp2 of the second pilot injection P2 and the end timing tep1 of the first pilot injection P1 is then calculated. The first interval dti1 is stored in advance in the ROM 42 in the form of a map shown in FIG. 22A as a function of the total fuel injection amount Qt and the engine speed Ne. The end timing tep1 for first pilot injection P1 is then calculated (tep1=tsp2−dti1). The fuel injection period dtp1 for first pilot injection P1 is then calculated. The fuel injection period dtp1 for first pilot injection P1 is the amount of time needed to inject the first pilot fuel injection amount Qp1. The first pilot fuel injection amount Qp1 is stored in advance in the ROM 42 in the form of a map shown in FIG. 23A as a function of the total fuel injection amount Qt and the engine speed Ne. A start timing tsp1 for first pilot injection P1 is then calculated (tsp1=tep1−dtp1).

The fuel injection period dtm for main injection M is then calculated, and the end timing tem for main injection M is calculated (tem=tsm+dtm).

As is the ease with the foregoing embodiments of the invention, when first pilot injection P1 is carried out, the fuel pressure in the fuel injection valve 3 pulsates, and when the second pilot injection P2 is carried out, the fuel pressure in the fuel injection valve 3 pulsates. In the fourth embodiment of the invention, the first interval dti1 is set so that the second pilot injection P2 is started at a zero gradient timing after first pilot injection P1, and the second interval dti2 is set so that the main injection M is started at a zero gradient timing after second pilot injection P2.

In addition, in the fourth embodiment of the invention, a switchover between the first interval dti1 and the second interval dti2 is made in accordance with the engine operational state.

Figure 24:
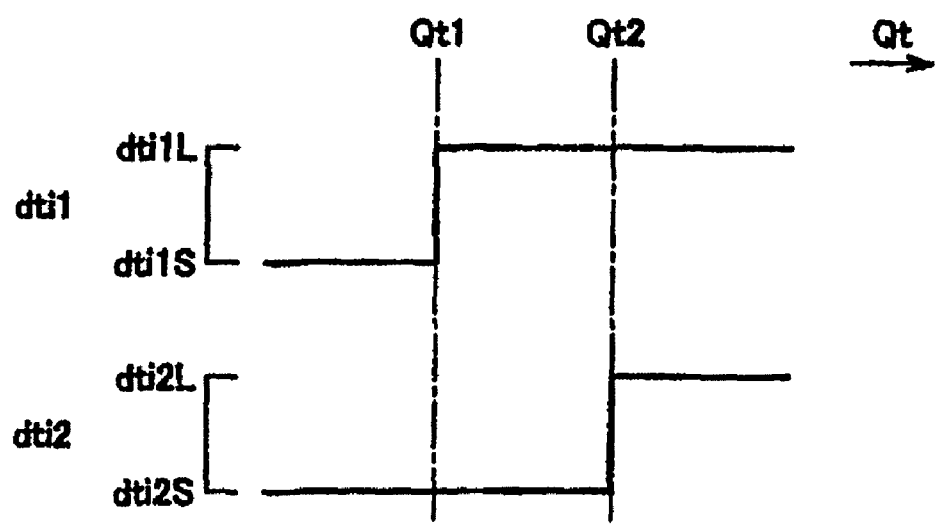
FIG. 24 is a diagram showing changes in the first interval dti1 and the second interval dti2.

That is, as shown in FIG. 24, the first interval dti1 is set to a short first interval dti1 S if the total fuel injection amount Qt is smaller than a first set value Qt1 determined in advance, and to a long first interval dti1L (>dti1S) if the total fuel injection amount Qt is equal to or larger than the first set amount Qt1. The second interval dti2 is set to a short second interval dti2S if the total fuel injection amount Qt is smaller than a second set amount Qt2 (>Qt1) determined in advance, and to a long second interval dti2L (>dti2S) if the total fuel injection amount Qt is equal to or larger than the second set amount Qt2. Accordingly, the first interval dti1 and the second interval dti2 are changed in a stepwise manner.

Figure 25A:
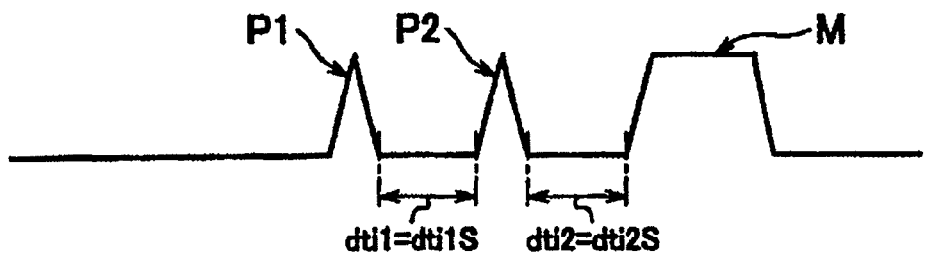
FIGS. 25A, 25B, and 25C are time charts similar to FIG. 21 that show changes in the first interval dti1 and the second interval dti2.
Figure 25B:
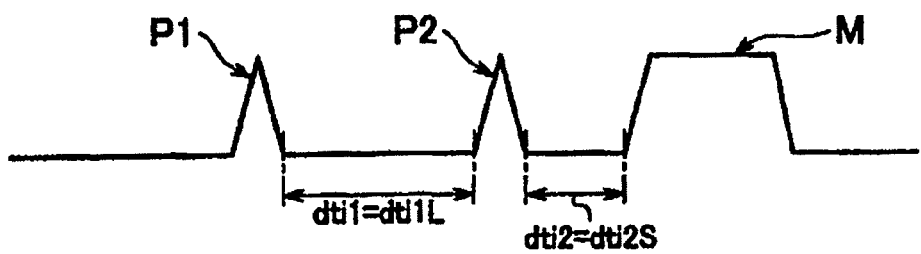
Figure 25C:
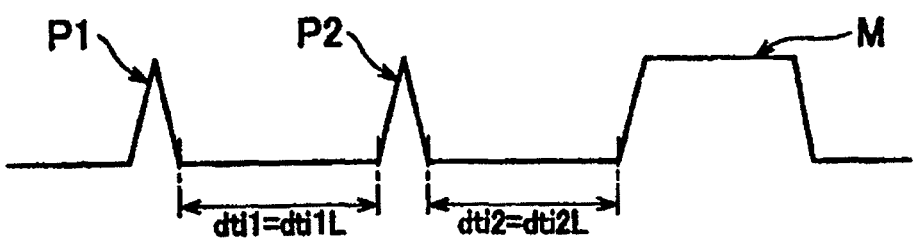

That is, if the total fuel injection amount Qt is smaller than the first set amount Qt1, the first interval dti 1 is set to the first short interval dti1S, and the second interval dti2 is set to the short second interval dti2S, as shown in FIG. 25A. However, if the total fuel injection amount Qt is equal to or larger than the first set amount Qt1 and smaller than the second set amount Qt2, the first interval dti 1 is set to the long first interval dti1L, and the second interval dti2 is set to the short second interval dti2S, as shown in FIG. 25B. If the total fuel injection amount Qt is larger than the second set amount Qt2, then the first interval dti1 is set to the long first interval dti1L, and the second interval dti2 is set to the long second interval dti2L, as shown in FIG. 25C.

Figure 26:
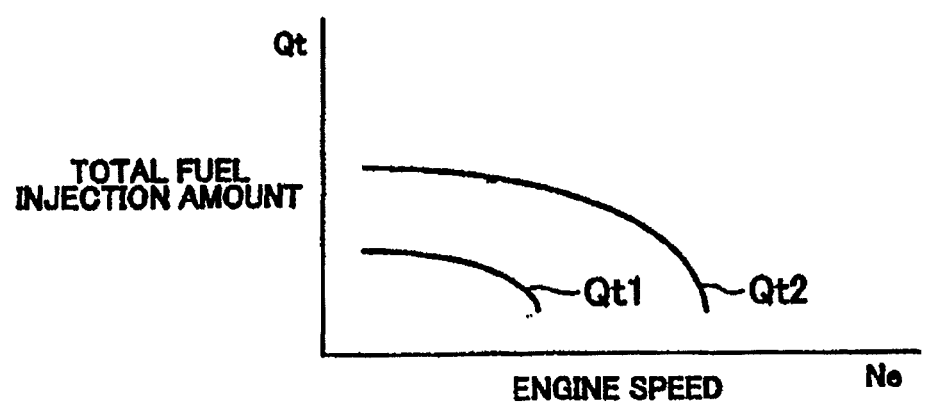
FIG. 26 is a diagram showing a first set amount Qt1 and a second set amount Qt2.

Accordingly, if, for example, the total fuel injection amount Qt increases beyond the first set amount Qt1, the first interval dti1 is extended stepwise from the short first interval dti1S to the first long interval dti1L, and the second interval dti2 is maintained at the short second interval dti2S in this case, as shown in FIGS. 25A and 25B. If the total fuel injection amount Qt increases beyond the second set amount Qt2, the second interval dti2 is extended stepwise from the short second interval dti2S to the long second interval dti2L, and the first interval dti1 is maintained at the long the first interval dti1L in this case, as shown in FIGS. 25B and 25C. The first set amount Qt1 and the second set amount Qt2 are stored in advance in the ROM 42 in the form of a map shown in FIG. 26 as a function of the engine speed Ne.

In this case, the short first interval dti1S is constituted by, for example, the first interval dti1 that ensures the second pilot injection P2 starts at the zero gradient timing arising for the first time after the first pilot injection P1, and the long first interval dti1L is constituted by, for example, the first interval dti1 that ensures the second pilot injection P2 starts at the third zero gradient timing that occurs after the first pilot injection P1. Likewise, the short second interval dti2S is constituted by, for example, the second interval dti2 that ensures the main injection M starts at the zero gradient timing arising for the first time that occurs after the second pilot injection P2, and the long second interval dti2L is constituted by, for example, the second interval dti2 that ensures the main injection M starts at the third zero gradient timing that occurs after the second pilot injection P2.

As described above, in the fourth embodiment of the invention, the first interval dti1 and the second interval dti2 are set short when the total fuel injection amount Qt is small and the load on the engine is low. Therefore, the amount of HC discharged from the combustion chamber is reduced, and the level of combustion noise is also reduced. In contrast, the first interval dti1 and the second interval dti2 are set long when the total fuel injection amount Qt is large and the load on the engine is high. Therefore, the amount of smoke discharged from the combustion chamber is reduced.

Accordingly, generally speaking, if there is a need to change the interval between preceding fuel injection and subsequent fuel injection, the interval is changed in a stepwise manner so that the subsequent fuel injection is carried out at another zero gradient timing after the preceding fuel injection.

Figure 27:
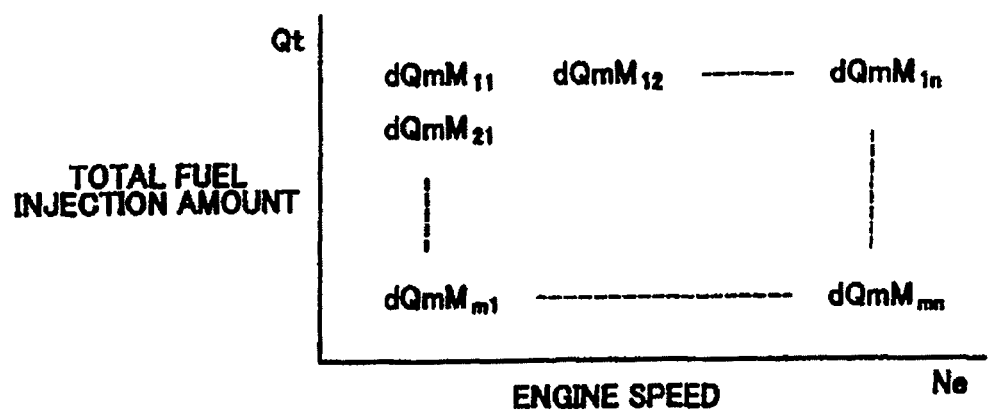
FIG. 27 is a view showing a map of the main fuel injection amount deviation dQmM at a zero gradient timing.

In the fourth embodiment of the invention, the main fuel injection amount deviation dQmM at the zero gradient timing determined in accordance with the second interval dti2 is stored in advance in the ROM 42 in the form of a map shown in FIG. 27 as a function of the total fuel injection amount Qt and the engine speed Ne. The main fuel injection amount Qm is corrected by this deviation dQmM (Qm=Qt−Qp1−Qp2−dQmM).

Figure 28:
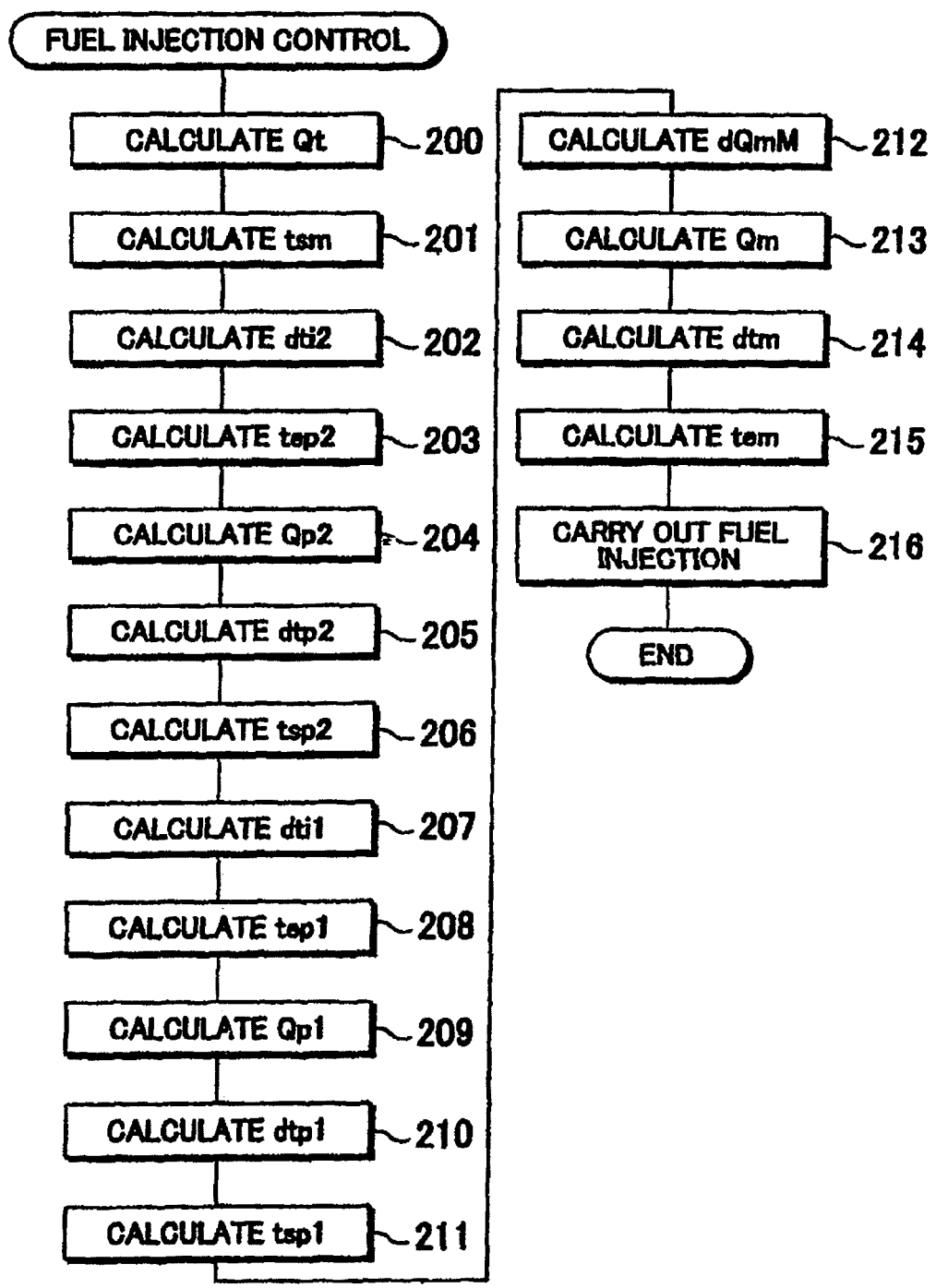
FIG. 28 is a flowchart for executing a fuel injection control routine according to the fourth embodiment of the invention.

FIG. 28 shows a routine for performing fuel injection control according to the fourth embodiment of the invention. The routine is executed periodically at predetermined intervals.

Referring to FIG. 28, first in step 200, the total fuel injection amount Qt is calculated from the map of FIG. 4. Then in step 201, the start timing tsm for the main injection M is calculated from the map of FIG. 5. Then in step 202, the second interval dti2 is calculated from the map of FIG. 22B. Then in step 203, the end timing tep2 for second pilot injection P2 is calculated (tep2=tsm−dti2). Then in step 204, the second pilot fuel injection amount Qp2 is calculated from the map of FIG. 23B. Then in step 205, the fuel injection period dtp2 for the second pilot injection P2 is calculated based on the second pilot fuel injection amount Qp2. Then in step 206, the start timing tsp2 for second pilot injection P2 is calculated (tsp2=tep2−dtp2). Then in step 207, the first interval dti 1 is calculated from the map of FIG. 22A. Then in step 208, the end timing tep1 for first pilot injection P1 is calculated (tep1=tsp2−dti1). Then in step 209, the first pilot fuel injection amount Qp1 is calculated from the map of FIG. 23A. Then in step 210, the fuel injection period dtp1 for the first pilot injection P1 is calculated based on the first pilot fuel injection amount Qp1. Then in step 211, the start timing tsp1 for first pilot injection P1 is calculated (tsp1=tep1−dtp1). Then in step 212, the main fuel injection amount deviation dQmM at the zero gradient timing determined in accordance with the second interval dti2 is calculated from the map of FIG. 27. Then in step 213, the main fuel injection amount Qm is calculated (Qm=Qt−Qp1−Qp2−dQmM). Then in step 214, the fuel injection period dtm for the main injection M is calculated based on the main fuel injection amount Qm. Then in step 215, the end timing tem for the main injection M is calculated (tem=tsm+dtm). Then in step 216, fuel injection is carried out using the calculated injection parameters.

In the fourth embodiment of the invention, the second pilot fuel injection amount Qp2 is not corrected. However, because the actual amount of fuel injected through second pilot injection P2 may deviate from the normal second pilot fuel injection amount Qp2, referred to as a second pilot fuel injection amount deviation dQp2, the second pilot fuel injection amount deviation dQp2 at the zero gradient timing determined in accordance with the first interval dti 1 may be obtained in advance and stored, and the second pilot fuel injection amount Qp2 may be corrected based on the second pilot fuel injection amount deviation dQp2.

The other details of the construction and operation of the fourth embodiment of the invention are identical to those of the first embodiment of the invention and hence will not be described below.

Figure 29A:
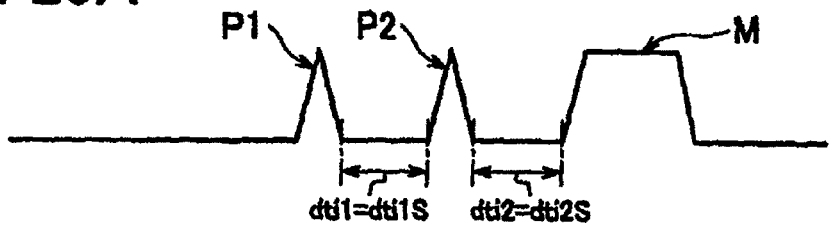
FIGS. 29A, 29B, 29C, 29D, and 29E are time charts each showing a needle lift amount of a fuel injection valve to explain the fifth embodiment of the invention.

Next, the fifth embodiment of the invention will be described. In the fifth embodiment of the invention as well as the foregoing fourth embodiment of the invention, in a stationary state where the total fuel injection amount Qt is smaller than the first set amount Qt1, the first interval dti1 is set to the short first interval dti1S, and the second interval dti2 is set to the short second interval dti2S, as shown in FIG. 29A. In a steady state where the total fuel injection amount Qt remains equal to or larger than the first set amount Qt1, but smaller than the second set amount Qt2, the first interval dti1 is set to the long first interval dti1L, and the second interval dti2 is set to the short second interval dti2S, as shown in FIG. 29C. Furthermore, in a steady state where the total fuel injection amount Qt remains equal to or larger than the second set amount Qt2, the first interval dti1 is set to the long first interval dti1L, and the second interval dti2 is set to the long second interval dti2L, as shown in FIG. 29E. In the following description, each of these injection modes is referred to as a steady state injection mode.

However, when the first interval dti1 is changed stepwise in response to an increase in the total fuel injection amount Qt beyond the first set amount Qt1, the timing when first pilot injection P1 is carried out drastically changes. Therefore, sudden fluctuations in the torque output of the engine, i.e. torque shock, may be generated. The same holds true when the second interval dti2 is increased stepwise in response to an increase in the total fuel injection amount Qt beyond the second set amount Qt2.

Thus, in the fifth embodiment of the invention, a transitional injection mode is temporarily implemented when changing between the first interval dti1 and the second interval dti2 to suppress the generation of torque shock.

Figure 29B:
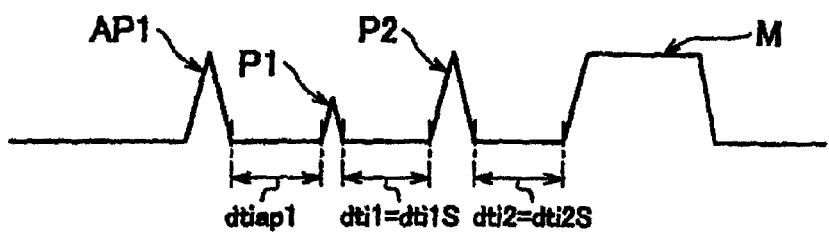
Figure 29C:
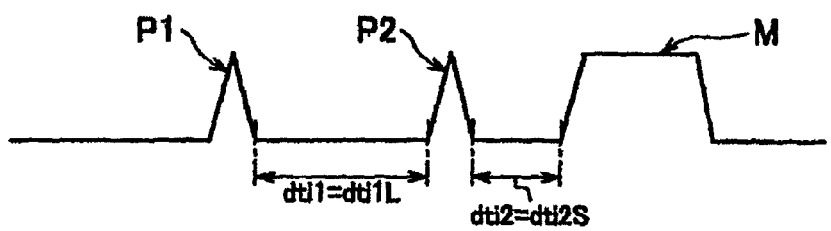

That is, if the first interval dti1 is increased from the short first interval dti1S (see FIG. 29A) to the long first interval dti1L (see FIG. 29C) in response to an increase in the total fuel injection amount Qt beyond the first set amount Qt1, the first pilot fuel injection amount Qp1 is reduced over time while maintaining the first interval dti1 as shown in FIG. 29B. Accordingly, a first additional fuel injection AP1 may be carried out before the first pilot injection P1. In this case, an interval dtiap1 from the end of first additional fuel injection AP1 to the start of first pilot injection P1 is set such that first pilot injection P1 starts at a zero gradient timing that occurs after the completion of first additional fuel injection AP1. The zero gradient timing in this case is selected so that the timing when first additional fuel injection AP1 is carried out is as close as possible to the timing when first pilot injection P1 is carried out when the first interval dti1 is set to the long first interval dti1L.

Then, when the first pilot fuel injection amount Qp1 is reduced to a predetermined lower limit, for example, approximately to zero, the first additional fuel injection AP1 is stopped, and the first interval dti1 is extended to the long first interval dti1L (see FIG. 29C). That is, a return from the transitional injection mode to the steady-state injection mode is made.

Figure 29D:
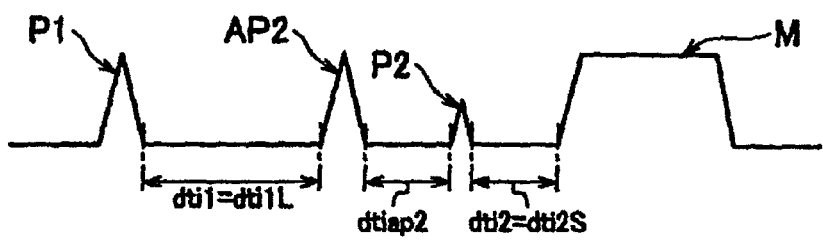
Figure 29E:
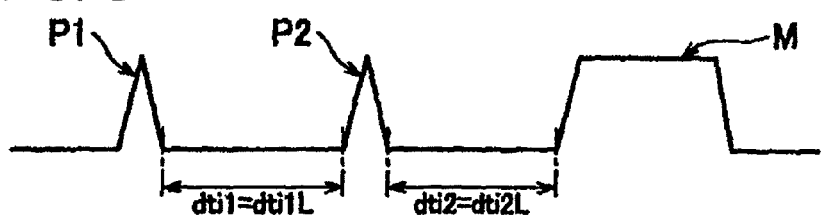

By the same token, if the second interval dti2 is increased from the second short interval dti2S (see FIG. 29C) to the long second interval dti1L (see FIG. 29E) in response to an increase in the total fuel injection amount Qt beyond the second set amount Qt2, the second pilot fuel injection amount Qp2 is reduced over time while maintaining the second interval dti2 as shown in FIG. 29D. Accordingly, a second additional fuel injection AP2 is carried out after the end of first pilot injection P1 and before the second pilot injection P2. In this case, an interval dtiap2 between the end of the second additional fuel injection AP2 and the start of the second pilot injection P2 is set so that the second pilot injection P2 starts at a zero gradient timing that occurs after the completion of second additional fuel injection AP2. The zero gradient timing in this case is selected so that the timing when the second additional fuel injection AP2 is carried out is as close as possible to the timing when the second pilot injection P2 is carried out when the second interval dti2 is set to the long second interval dti2L. In addition, the interval between the end of the first pilot injection P1 and the start of the second additional fuel injection AP2 is set to the first interval dti1.

Then, if the second pilot fuel injection amount Qp2 is reduced to a predetermined lower limit, the second additional fuel injection AP2 is stopped, and the second interval dti2 is extended to the long second interval dti2L (see FIG. 29E). That is, the steady-state injection mode is resumed.

In the fifth embodiment of the invention, the fuel injection amounts for the first additional fuel injection AP1 and the second additional fuel injection AP2 are held constant. However, the fuel injection amount for the first and second additional fuel injections may be changed, respectively based on, for example, the engine operational state or the first pilot fuel injection amount Qp1 and the engine operational state and the second pilot fuel injection amount Qp2.

Accordingly, if the timing when there is a need to carry out preceding fuel injection is set to a timing advanced from the timing when there is a need to carry out subsequent fuel injection by the interval and there is a need to extend the interval from a short interval to a long interval, the fuel injection amount for the preceding fuel injection is reduced over time while holding the interval equal to the short interval. Then, when the fuel injection amount for the preceding fuel injection is reduced to the predetermined lower limit, the interval is extended to the long interval.

The fifth embodiment of the invention is also applicable to a case where the preceding fuel injection is constituted by main injection M and the subsequent fuel injection is constituted by after-injection A (see FIG. 16). In this case, the timing when there is a need to carry out the subsequent fuel injection is set to a timing retarded from the timing when there is a need to carry out the preceding fuel injection by the interval. If there is a need to extend the interval from the short interval to the long interval, the fuel injection amount for the subsequent fuel injection is reduced over time while holding the interval equal to the short interval. Then, when the fuel injection amount for the subsequent fuel injection is reduced to the lower limit, the interval is increased to the long interval.

Figure 30:
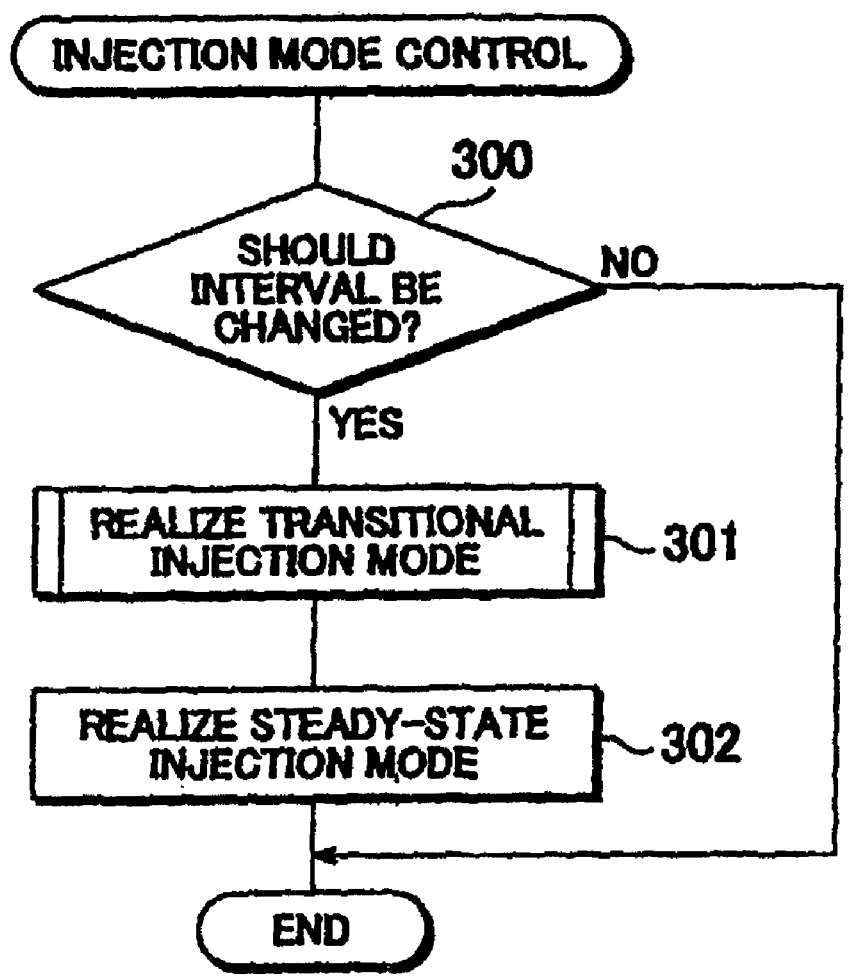
FIG. 30 is a flowchart for executing an injection mode control routine according to the fifth embodiment of the invention.

FIG. 30 shows a routine for performing injection mode control according to the fifth embodiment of the invention. This routine is executed periodically at predetermined intervals.

Referring to FIG. 30, first in step 300, it is determined whether there is a need to change the first interval dti1 or the second interval dti2. If it is determined that it is necessary to change the first interval dti1 or the second interval dti2, then, in step 301, the transitional injection mode is implemented. Then, the steady-state injection mode is implemented in step 302. On the other hand, if it is determined that it is not necessary to change either the first interval dti1 or the second interval dti2, the process proceeds to step 302, where the steady-state injection mode is implemented.

The other details of the structure and operation of the fifth embodiment of the invention are identical to those of the fourth embodiment of the invention and hence will not be described below.

The invention claimed is:

1. A fuel injection control apparatus for an internal combustion engine equipped with a fuel injection valve coupled to a common rail and designed to sequentially carry out fuel injection a plurality of times with an interval, comprising:
a controller that sets an interval between a preceding fuel injection and a subsequent fuel injection so that the subsequent fuel injection is carried out at a zero gradient timing as a timing when a gradient of a fuel pressure in the fuel injection valve after completion of the preceding fuel injection is approximately equal to zero, when the fuel pressure in the fuel injection valve pulsates in response to the fuel injection.

2. The fuel injection control apparatus according to claim 1, wherein the controller sets the interval so that the subsequent fuel injection is carried out at the zero gradient timing arising for a first time when the zero gradient timing arises a plurality of times after the preceding fuel injection.

3. The fuel injection control apparatus according to claim 1, wherein the controller sets the preceding fuel injection and the subsequent fuel injection as a pilot injection and a main injection respectively.

4. The fuel injection control apparatus according to claim 1, wherein the controller sets the preceding fuel injection and the subsequent fuel injection as a pilot injection, and further sets a main injection after the subsequent fuel injection.

5. The fuel injection control apparatus according to claim 1, wherein the controller changes the interval in a stepwise manner so that the subsequent fuel injection is carried out at another different zero gradient timing that occurs after completion of the preceding fuel injection when there is a need to change the interval in a case where the zero gradient timing arises a plurality of times after the preceding fuel injection.

6. The fuel injection control apparatus according to claim 5, wherein the controller reduces a fuel injection amount for the preceding fuel injection over time while holding the interval equal to a short interval when there is a need to extend the interval from the short interval to a long interval in a case where a timing when there is a need to carry out the preceding fuel injection is set to a timing advanced from a timing when there is a need to carry out the subsequent fuel injection by the interval, and then extends the interval to the long interval when the fuel injection amount for the preceding fuel injection is reduced to a predetermined lower limit.

7. The fuel injection control apparatus according to claim 1, wherein the controller sets the interval so that the subsequent fuel injection is carried out when the fuel pressure in the fuel injection valve is higher than a predetermined set value at the zero gradient timing.

8. The fuel injection control apparatus according to claim 7, characterized in that the controller sets the preceding fuel injection and the subsequent fuel injection as a main injection and an after-injection respectively.

9. The fuel injection control apparatus according to claim 1, wherein the controller obtains in advance and stores a deviation of an actual fuel injection amount from a normal fuel injection amount for the subsequent fuel injection at the zero gradient timing, and corrects a fuel injection period for the subsequent fuel injection based on the deviation.

10. The fuel injection control apparatus according to claim 1, wherein the controller obtains in advance and stores a deviation of an actual fuel injection amount from a normal fuel injection amount for the subsequent fuel injection at the zero gradient timing, and sets the interval so that the deviation falls within a preset permissible range.

11. A fuel injection control method for an internal combustion engine equipped with a fuel injection valve coupled to a common rail and designed to sequentially carry out fuel injection a plurality of times with an interval, the fuel injection control method comprising:

setting an interval between a preceding fuel injection and a subsequent fuel injection so that the subsequent fuel injection is carried out at a zero gradient timing as a timing when a gradient of a fuel pressure in the fuel injection valve after completion of the preceding fuel injection is approximately equal to zero when the fuel pressure in the fuel injection valve pulsates in response to the fuel injection.

12. The fuel injection control method according to claim 11, wherein the interval is set such that the subsequent fuel injection is carried out at the zero gradient timing arising for a first time when the zero gradient timing arises a plurality of times after the preceding fuel injection.

13. The fuel injection control method according to claim 11, wherein the preceding fuel injection and the subsequent fuel injection are set as a pilot injection and a main injection respectively.

14. The fuel injection control method according to claim 11, wherein the preceding fuel injection and the subsequent fuel injection are set as a pilot injection, and that a main injection is further set after the subsequent fuel injection.

15. The fuel injection control method according to claim 11, further comprising:

changing the interval in a stepwise manner so that the subsequent fuel injection is carried out at another different zero gradient timing after completion of the preceding fuel injection when there is a need to change the interval in a case where the zero gradient timing arises a plurality of times after the preceding fuel injection.

16. The fuel injection control method according to claim 15, further comprising:

reducing a fuel injection amount for the preceding fuel injection over time while holding the interval equal to a short interval when there is a need to extend the interval from the short interval to a long interval in a case where a timing when there is a need to carry out the preceding fuel injection is set to a timing advanced from a timing when there is a need to carry out the subsequent fuel injection by the interval; and then extending the interval to the long interval when the fuel injection amount for the preceding fuel injection is reduced to a predetermined lower limit.

17. The fuel injection control method according to claim 11, wherein the interval is set so that the subsequent fuel injection is carried out when the fuel pressure in the fuel injection valve is higher than a predetermined set value at the zero gradient timing.

18. The fuel injection control method according to claim 17, wherein the preceding fuel injection and the subsequent fuel injection are set as a main injection and an after-injection respectively.

19. The fuel injection control method according to claim 11, further comprising:

obtaining in advance and storing a deviation of an actual fuel injection amount from a normal fuel injection amount for the subsequent fuel injection at the zero gradient timing; and correcting a fuel injection period for the subsequent fuel injection based on the deviation.

20. The fuel injection control method according to claim 11, further comprising:

obtaining in advance and storing a deviation of an actual fuel injection amount from a normal fuel injection amount for the subsequent fuel injection at the zero gradient timing; and setting the interval so that the deviation falls within a preset permissible range.

\* \* \* \* \*